United States Patent [19]

Kimura et al.

[11] Patent Number: 5,768,590
[45] Date of Patent: Jun. 16, 1998

[54] PROGRAM GENERATING SYSTEM FOR APPLICATION-SPECIFIC ADD-ON BOARDS USING THE LANGUAGE OF INDIVIDUALS

[75] Inventors: Takahisa Kimura; Kaname Kobayashi, both of Kawasaki, Japan

[73] Assignee: Fujitsu Limited, Kawasaki, Japan

[21] Appl. No.: 429,100

[22] Filed: Apr. 26, 1995

[30] Foreign Application Priority Data

Aug. 1, 1994 [JP] Japan ................... 6-179880

[51] Int. Cl.$^6$ ................... G06F 9/45
[52] U.S. Cl. ................... 395/702
[58] Field of Search ................... 395/650, 280, 395/281, 282, 702, 705, 707

[56] References Cited

U.S. PATENT DOCUMENTS

| | | |
|---|---|---|
| 4,070,704 | 1/1978 | Calle et al. ................... 395/700 |
| 4,590,557 | 5/1986 | Lillie ................... 395/700 |
| 5,237,690 | 8/1993 | Bealkowski et al. ................... 395/700 |
| 5,247,683 | 9/1993 | Holmes et al. ................... 395/700 |
| 5,295,263 | 3/1994 | Kojima et al. ................... 395/650 |
| 5,313,614 | 5/1994 | Goettelmann et al. ................... 395/500 |
| 5,430,878 | 7/1995 | Straub et al. ................... 395/700 |
| 5,444,642 | 8/1995 | Montgomery et al. ................... 395/700 |
| 5,579,489 | 11/1996 | Dornier et al. ................... 395/281 |
| 5,590,373 | 12/1996 | Whitley et al. ................... 395/828 |

*Primary Examiner*—Emanuel Todd Voeltz
*Assistant Examiner*—Peter J. Corcoran, III
*Attorney, Agent, or Firm*—Staas & Halsey

[57] ABSTRACT

A program generating system which automatically rewrites a program using an individual's language upon addition of an application-specific add-on board has a program generating device for generating a program using an individual's language and a transformation data updating device for updating transformation data to generate updated transformation data for indicating rewriting the program upon addition of the application-specific add-on board. The program generating device transforms an initial document described in the individual's language into a computer program according to a given role pattern and role assignment knowledge. The transformation data generated by the transformation data updating device modifies the role pattern and role assignment knowledge in the program generating device, and uses the same initial document as that used to generate the original program for a computer before the application-specific add-on board is added thereto, for generating a rewritten program as required by the addition of the application-specific add-on board.

8 Claims, 39 Drawing Sheets

```
INITIAL DOCUMENT FILE ..............................................
■=(:,)#[]*.→(}■
[TIME-SERIES ANALYSIS ACCORDING TO REAL CEPSTRUM PROCESS]
    INPUT TIME-SERIES DATA AT N POINTS FROM INPUT DATA FILE
      TO x.
    EFFECT REAL CEPSTRUM ANALYSIS.
    OUTPUT N CEPSTRUM DATA FROM q TO OUTPUT DATA FILE.
    END ANALYSIS.
[EFFECT REAL CEPSTRUM ANALYSIS]
    DETERMINE FREQUENCY COMPONENT f OF TIME SERIES x
      COMPOSED OF N POINTS.
    APPLY ABSOLUTE LOGARITHMIC FUNCTION TO N ELEMENTS OF
      FREQUENCY COMPONENT f.
    DETERMINE FREQUENCY COMPONENT q OF TIME SERIES f
      COMPOSED OF N POINTS.
```

```
..INITIAL ROLE TREE                                                              73
■-(:,)#■
TOP VIEW = PART ROW (
    PART (NAME: TIME-SERIES ANALYSIS ACCORDING TO REAL CEPSTRUM PROCESS,
          CONTENT: ROW (
                      INPUT TIME-SERIES DATA AT N POINTS FROM INPUT DATA
                      FILE TO x,
                      EFFECT REAL CEPSTRUM ANALYSIS,
                      OUTPUT CEPSTRUM DATA AT N POINTS FROM q TO OUTPUT
                      DATA FILE,
                      END ANALYSIS
                      )
          ),
    PART (NAME: EFFECT REAL CEPSTRUM ANALYSIS,
          CONTENT: ROW (
                      DETERMINE FREQUENCY COMPONENT f OF TIME SERIES x
                      COMPOSED OF N POINTS,
                      APPLY ABSOLUTE LOGARITHMIC FUNCTION TO N ELEMENTS OF
                      FREQUENCY COMPONENT f,
                      DETERMINE FREQUENCY COMPONENT q OF TIME SERIES f
                      COMPOSED OF N POINTS
                      )
          )
                      )
```

FIG. 10

```
.. SET OF VOCABULARY TRANSFORMATION RULES ...............
■[ ]→▲■
       .. OMITTED ..
DETERMINE FREQUENCY COMPONENT [f] OF TIME SERIES [x]
COMPOSED OF [N] POINTS →
FREQUENCY ANALYSIS (NUMBER OF DATA: [N], TIME SERIES: [x],
FREQUENCY COMPONENT: [f]) ▲
APPLY [ABSOLUTE LOGARITHMIC] FUNCTION TO [N] ELEMENTS OF
FREQUENCY COMPONENT [f] →
APPLICATION OF SEQUENTIAL FUNCTION (NAME OF FUNCTION:
[ABSOLUTE LOGARITHMIC], SEQUENCE HANDLED: [f], NUMBER OF
DATA: [N]) ▲
       .. OMITTED ..
```

```
                                                        7 5
                                                         /
--BEGINNING ROLE TREE ----------------------------------/-------
■=(:,)#■
TOP VIEW = PART ROW (
  PART (NAME: TIME-SERIES ANALYSIS ACCORDING TO REAL CEPSTRUM
                PROCESS,
        CONTENT: ROW (
                  ·· OMITTED ··
                  EFFECT REAL CEPSTRUM ANALYSIS,
                  ·· OMITTED ··
                    )
        ),
  PART (NAME: EFFECT REAL CEPSTRUM ANALYSIS,
        CONTENT: ROW (
                  FREQUENCY ANALYSIS (NUMBER OF DATA: N,
                    TIME SERIES: x, FREQUENCY COMPONENT: f),
                  APPLICATION OF SEQUENTIAL FUNCTION (NAME OF
                    FUNCTION: ABSOLUTE LOGARITHMIC, SEQUENCE
                    HANDLED: f, NUMBER OF DATA: N),
                  FREQUENCY ANALYSIS (NUMBER OF DATA: N,
                    TIME SERIES: f, FREQUENCY COMPONENT: q)
                    )
        )
                    )
```

FIG. 12

```
-COMPUTATION STRUCTURE DESCRIPTION ROLE TREE                         76b
■-(:,)#■
TOP VIEW - MAIN PROGRAM (
  EXTERNAL PROCEDURE DECLARATION: ROW (),
  VARIABLE DECLARATION: ROW (),
  PROCEDURE DIVISION: PROCESSING PROCEDURE (
                INITIALIZING DIVISION: ROW (),
                PROCESSING BODY: PART ROW (
             PART (NAME: TIME-SERIES ANALYSIS ACCORDING TO REAL
                         CEPSTRUM PROCESS,
                   CONTENT: ROW (
                        ·· OMITTED ··
                      EFFECT REAL CEPSTRUM ANALYSIS,
                        ·· OMITTED ··
                            )
                   )
             PART (NAME: EFFECT REAL CEPSTRUM ANALYSIS,
                   CONTENT: ROW (
                            FREQUENCY ANALYSIS (NUMBER OF DATA:
                            N, TIME SERIES: x, FREQUENCY
                            COMPONENT: f),
                            APPLICATION OF SEQUENTIAL FUNCTION
                            (NAME OF FUNCTION: ABSOLUTE
                            LOGARITHMIC, SEQUENCE
                            HANDLED: f, NUMBER OF DATA: N),
                            FREQUENCY ANALYSIS (NUMBER OF DATA:
                            N, TIME SERIES: f, FREQUENCY
                            COMPONENT: q)
                            )
                   )
                        ),
                END PROCESSING DIVISION: ROW ()
                        )
                            )
```

FIG. 13

SET OF TRANSFORMATION RULES FOR REALIZING COMPUTATION STRUCTURE

■= (:,) #(~→)¥*@_■

.. OMITTED ..

☆ ASSIGN COMPUTATION PROCEDURE TO PROCESSING BODY IN PROCESSING
PROCEDURE IN PROCEDURE DIVISION (¥x=PART ROW (@proc) →

TOP VIEW = MAIN PROGRAM (EXTERNAL PROCEDURE DECLARATION ROW (),
VARIABLE DECLARATION: ROW (),
PROCEDURE DIVISION: PROCESSING PROCEDURE (
INITIALIZING DIVISION:
ROW (),
PROCESSING BODY: PART
ROW (@proc),
END PROCESSING DIVISION:
ROW ()
) 1)

```
 BEHAVIOR STRUCTURE DESCRIPTION ROLE TREE ................................/....... 76d
 ■-(:,)#■
 TOP VIEW = MAIN PROGRAM (
  EXTERNAL PROCEDURE DECLARATION: ROW (),
  VARIABLE DECLARATION: ROW (),
  PROCEDURE DIVISION: PROCESSING PROCEDURE (
   INITIALIZING DIVISION: ROW (),
   PROCESSING BODY: MAIN PROCEDURE (
              NAME: TIME-SERIES ANALYSIS ACCORDING TO REAL CEPSTRUM
                  PROCESS,
           CONTENT: ROW (
                 ·· OMITTED ··,
              UNLABELED BLOCK (CONTENT: ROW (
                 COMMENT (CONTENT: EFFECT REAL CEPSTRUM ANALYSIS),
                 PROCEDURE CALLING (
                    NAME: FREQUENCY ANALYSIS
                    ARGUMENT: ROW (VARIABLE (NAME: N, TYPE :INTEGER TYPE
                                  (SIZE: STANDARD)),
                                VARIABLE (NAME x, TYPE: REAL ARRAY TYPE
                                  (SIZE: N)),
                                VARIABLE (NAME f, TYPE: REAL ARRAY TYPE
                                  (SIZE: N))
                                ),
                    ·· OMITTED ··,
                 PROCEDURE CALLING (
                    NAME: FREQUENCY ANALYSIS
                    ARGUMENT: ROW (VARIABLE (NAME: N, TYPE :INTEGER TYPE
                                  (SIZE: STANDARD)),
                                VARIABLE (NAME f, TYPE: REAL ARRAY TYPE
                                  (SIZE: N)),
                                VARIABLE (NAME q, TYPE: REAL ARRAY TYPE
                                  (SIZE: N))
                                )
                                ))
```

FIG. 15A

```
                        )
   -- OMITTED --
                        ),
END PROCESSING DIVISION: ROW ()
                        )
                            )
```

FIG. 15B      76d

```
                                                              76ca
                                                             /
..SET OF TRANSFORMATION RULES FOR REALIZING COMPUTATION STRUCTURE
■=(:,)#{-→}¥*@_■
·· OMITTED ··
☆ IF THERE IS A SENTENCE WHICH IS THE SAME AS A PART NAME, THEN
  DEVELOP THE CONTENT OF A PART IS DEVELOPED AS AN UNLABELED BLOCK IN
  THAT LOCATION
  TO PREVENT RULES FROM BECOMING COMPLEX, A SENTENCE WHICH REFERS TO THE
  SAME PART APPEARS AT MOST ONCE.
 {¥x=ROW (@head, ¥stat, @tail) -¥stat=¥p(¥r: ¥s)
  ¥y=PART (NAME: ¥stat, CONTENT: @body)
    →
  ¥new=UNLABELED BLOCK (CONTENT: ROW (COMMENT (CONTENT: ¥stat), @body))
  ¥x=ROW (@head, ¥new, @tail)        1}

·· OMITTED ··

☆ REALIZE FREQUENCY ANALYSIS WITH PROCEDURE CALLING.
 {¥v=FREQUENCY ANALYSIS (NUMBER OF DATA: ¥N, TIME SERIES: ¥x,
    FREQUENCY COMPONENT: ¥f)
     →
  ¥v=PROCEDURE CALLING (NAME: FREQUENCY ANALYSIS,
                 ARGUMENT: ROW (
                     VARIABLE (NAME: ¥N, TYPE :INTEGER TYPE
                        (SIZE: STANDARD)),
                     VARIABLE (NAME ¥x, TYPE: REAL ARRAY TYPE
                        (SIZE: ¥N)),
                     VARIABLE (NAME ¥f, TYPE: REAL ARRAY TYPE
                        (SIZE: ¥N))
                  )}

·· OMITTED ··
```

FIG. 16A

☆ REGARD A PART ROW COMPOSED OF A FINALLY LEFT SOLE PART AS A MAIN
  PROCEDURE
  {¥v=PART ROW (¥p) ¥p=PART (NAME: ¥name, CONTENT: ¥proc)
     →
  ¥v=PART ROW () ~¥p=PART (NAME: ¥name, CONTENT: ¥proc)
  ¥v=MAIN PROCEDURE (NAME: ¥name, CONTENT: ¥proc)}

FIG. 16B        76ca

```
→ENDING ROLE TREE ································································(·······
■-(:,)#■

TOP VIEW - MAIN PROGRAM (
 EXTERNAL PROCEDURE DECLARATION: ROW (
    PROCEDURE FORMAT (
            NAME: FREQUENCY ANALYSIS,
        ARGUMENT: TYPE NAME ROW (
                INTEGER TYPE (SIZE: STANDARD),
                REAL ARRAY TYPE (SIZE: N),
                REAL ARRAY TYPE (SIZE: N)))
                        ),
 VARIABLE DECLARATION: ROW (
   VARIABLE FORMAT (NAME: N, TYPE: INTEGER TYPE (SIZE: STANDARD)),
   VARIABLE FORMAT (NAME: x, TYPE: REAL ARRAY TYPE (SIZE: N)),
   VARIABLE FORMAT (NAME: f, TYPE: REAL ARRAY TYPE (SIZE: N)),
   VARIABLE FORMAT (NAME: q, TYPE: REAL ARRAY TYPE (SIZE: N))
                ),
 PROCEDURE DIVISION: PROCESSING PROCEDURE (
   INITIALIZING DIVISION: ROW (),
   PROCESSING BODY: MAIN PROCEDURE (
       NAME: TIME-SERIES ANALYSIS ACCORDING TO REAL CEPSTRUM PROCESS,
       CONTENT: ROW (
              ·· OMITTED ··,
           UNLABELED BLOCK (CONTENT: ROW (
              COMMENT (CONTENT: EFFECT REAL CEPSTRUM ANALYSIS),
              PROCEDURE CALLING (NAME: FREQUENCY ANALYSIS, ARGUMENT:
                              VARIABLE NAME ROW (N, x, f)),
              ·· OMITTED ··,
              PROCEDURE CALLING (NAME: FREQUENCY ANALYSIS, ARGUMENT:
                              VARIABLE NAME ROW (N, f, q))
                          ))
               )
            ·· OMITTED ··
                ),
```

FIG. 17A

```
END PROCESSING DIVISION: ROW ()
                        )
                              )
```

FIG. 17B            77

```
                                                            76ea
┌─────────────────────────────────────────────────────────────┐
│ SET OF TRANSFORMATION RULES FOR REALIZING COMPUTATION STRUCTURE OF
│ COMPUTER PROGRAMS
│ ■=(:,)#(→)¥*@_■
│ ·· OMITTED ··
│ ☆ VARIABLE REGISTRATION PROCESSING
│ (¥varUsed=VARIABLE (NAME: ¥name, TYPE: ¥type (SIZE: ¥size))
│  ¥varDcld=VARIABLE DECLARATION (@variables)
│ ~¥var=VARIABLE FORMAT (NAME: ¥name, TYPE: ¥type (SIZE: ¥size))
│      →
│  ¥var=VARIABLE FORMAT (NAME: ¥name, TYPE: ¥type (SIZE: ¥size))
│  ¥varDcld=VARIABLE DECLARATION (@variables, ¥var) }
│ ·· OMITTED ··
│ ☆ EXTERNAL PROCEDURE REGISTRATION PROCESSING
│ ★ REGISTRATION OF PROCEDURE FORMAT
│ (¥procUsed=PROCEDURE CALLING (NAME: ¥name, ARGUMENT: ROW (@args))
│  ¥procDcld=EXTERNAL PROCEDURE DECLARATION (@extProcs)
│ ~¥proc=PROCEDURE FORMAT (NAME: ¥name)
│      →
│  ¥proc=PROCEDURE FORMAT (NAME: ¥name, ARGUMENT: TYPE NAME ROW (@args))
│     ¥procDcld=EXTERNAL PROCEDURE DECLARATION (@extProcs, ¥proc)}
│ ★ ADJUSTMENT OF REGISTRATION EXTERNAL PROCEDURE ARGUMENT LIST
│ (¥proc=PROCEDURE FORMAT (NAME: ¥name,
│                  ARGUMENT: TYPE NAME ROW (@head, ¥var, @tail))
│  ¥var=VARIABLE FORMAT (NAME: ¥name, TYPE: ¥type (SIZE: ¥size))
│      →
│ ~¥var=VARIABLE FORMAT (NAME: ¥name, TYPE: ¥type (SIZE: ¥size))
│  ¥new=¥type (size: ¥size)
│  ¥proc=PROCEDURE FORMAT (NAME: ¥name,
│                  ARGUMENT: TYPE NAME ROW (@head, ¥new, @tail)))
│ ☆ PROCESSING FOR ADJUSTMENT OF PROCEDURE CALLING ARGUMENT FORMAT
└─────────────────────────────────────────────────────────────┘
```

FIG. 18A

```
* GENERATION OF PROCEDURE CALLING STATEMENT
{¥stat=PROCEDURE CALLING (NAME: ¥name, ARGUMENT: ROW (@args))
     →
 ¥stat=PROCEDURE CALLING STATEMENT (NAME: ¥name, ARGUMENT: VARIABLE
                                     NAME ROW (@args))
* DELETION OF TYPE INFORMATION OF ARGUMENT LIST
{¥stat=PROCEDURE CALLING STATEMENT (NAME: ¥name,
                                    ARGUMENT: VARIABLE NAME ROW
                                    (@head, ¥var, @tail))
 ¥var=VARIABLE FORMAT (NAME: ¥name, TYPE: ¥type (SIZE: ¥size))
     →
 ~¥var=VARIABLE FORMAT (NAME: ¥name, TYPE: ¥type (SIZE: ¥size))
 ¥stat=PROCEDURE CALLING STATEMENT (NAME: ¥name,
                                    ARGUMENT: VARIABLE NAME ROW
                                    (@head, ¥var, @tail))
·· OMITTED ··
```

```
COMPUTER PROGRAM SOURCE CODE (ORIGINAL PROGRAM)
void main () {
     extrn fft(int, real[N], real[N]);
     int N;
     real x[N];
     real f[N];
     real q[N];
     /*TIME-SERIES ANALYSIS ACCORDING TO
       REAL CEPSTRUM PROCESS*/

.. OMITTED ..,
         {
     /*EFFECT TIME-SERIES ANALYSIS*/
         call fft(N,x,f);
              .. OMITTED ..,
         call fft(N,f,q);
         }
              .. OMITTED ..,
     exit(0)
         }
```

FIG. 19

```
SET OF PATTERNS ─────────────────────── 78a ──────────
■=→▲[]«»■
MAIN PROGRAM = void main ()    {
      [EXTERNAL PROCEDURE DECLARATION]
      [VARIABLE DECLARATION]
      [PROCEDURE DIVISION]
      exit(0)
          }▲
VARIABLE NAME ROW → [VARIABLE NAME] «, [VARIABLE NAME]» ▲
TYPE NAME ROW → [TYPE NAME] «, [TYPE NAME]» ▲
PROCEDURE FORMAT = extrn [NAME] ([ARGUMENT]); ▲
VARIABLE FORMAT = [NAME] [TYPE]; ▲
INTEGER TYPE = int [SIZE]; ▲
REAL ARRAY TYPE = real [[SIZE]]; ▲
PROCESSING PROCEDURE = [INITIALIZING DIVISION]
[PROCESSING BODY]
[END PROCESSING] ▲
MAIN PROCEDURE = /*[NAME]*/
      [CONTENT] ▲
UNLABELED BLOCK = {
      [CONTENT]
} ▲
COMMENT = /*[CONTENT]*/▲
PROCEDURE CALLING STATEMENT = call [NAME] ([ARGUMENT]); ▲
ROW → [ROW ELEMENT] «
      [ROW ELEMENT] »
```

```
UPDATING TRANSFORMATION DATA
■=(:,)#(-→)Y*@_■
·· OMITTED ··
☆ EFFECT FREQUENCY ANALYSIS ON ADD-ON BOARD
★ INCORPORATE ADD-ON BOARD CONTROL PROGRAM
(Yv=FREQUENCY ANALYSIS(NUMBER OF DATA: YN, TIME SERIES: Yx,
     FREQUENCY COMPONENT: Yf)
     →
 Yv=CONDITIONAL BRANCH(
      CONDITION: NON-IDENTICAL VALUE (
        RIGHT-HAND SIDE: PROCEDURE CALLING (
           NAME: OPERATE ADD-ON BOARD,
           ARGUMENT: ROW (
              VARIABLE (NAME: FFT, TYPE: CHARACTER STRING TYPE (SIZE:
                        STANDARD)),
              VARIABLE (NAME: YN, TYPE: INTEGER TYPE (SIZE:
                        STANDARD)),
              VARIABLE (NAME: Yx, TYPE: REAL ARRAY TYPE (SIZE: YN)),
              VARIABLE (NAME: Yf, TYPE: REAL ARRAY TYPE (SIZE: YN))
              ),
        LEFT-HAND SIDE: TRUE VALUE),
      CONTENT: STOP AFTER MESSAGE IS PRINTED
           )))
★ REGISTER FFT AS A VARIABLE WITH AN INITIAL VALUE
(Yv=MAIN PROGRAM (VARIABLE DECLARATION: ROW (@varDcl))
~Yw=VARIABLE FORMAT (NAME: FFT)
     →
 Yw=VARIABLE INITIAL VALUE (VARIABLE: VARIABLE FORMAT (NAME: FFT,
                           TYPE: CHARACTER STRING TYPE (SIZE:
                           STANDARD))
                           VALUE: 'fft')
 YvarSeq=ROW (@varDcl, Yw))
```

FIG. 22A

```
* INCORPORATE PROGRAM FOR STARTING/ENDING TO USE ADD-ON BOARD
* START OF USE
{Yproc=PROCESSING PROCEDURE (PROCESSING PROCEDURE BODY: ROW (@head, Yv,
                                @tail))
 Yv=PROCEDURE CALLING (NAME: OPERATE ADD-ON BOARD)
 Yinit=PROCESSING PROCEDURE (INITIALIZING DIVISION: YstatSeq)
~YstatSeq=ROW (@begin, Yw, @end)
 Yw=PROCEDURE CALLING (NAME: START USING ADD-ON BOARD)
    →
 Ynew=PROCEDURE CALLING (NAME: START USING ADD-ON BOARD,
                    ARGUMENT: VARIABLE (NAME: ADD-ON BOARD
                                              CONNECTION PATH,
                                        TYPE: INTEGER TYPE
                                              (SIZE: STANDARD)))
 Yinit=PROCESSING PROCEDURE (INITIALIZING DIVISION: ROW (@stat, Ynew))}
* END OF USE
{Yproc=PROCESSING PROCEDURE (PROCESSING PROCEDURE BODY: ROW (@head, Yv,
                                @tail))
 Yv=PROCEDURE CALLING (NAME: OPERATE ADD-ON BOARD)
 Yinit=PROCESSING PROCEDURE (INITIALIZING DIVISION: YstatSeq)
~YstatSeq=ROW (@begin, Yw, @end)
 Yw=PROCEDURE CALLING (NAME: END USING ADD-ON BOARD)
    →
 Ynew=PROCEDURE CALLING (NAME: END USING ADD-ON BOARD,
                    ARGUMENT: VARIABLE (NAME: ADD-ON BOARD
                                              CONNECTION PATH,
                                        TYPE: INTEGER TYPE
                                              (SIZE: STANDARD)))
 Yinit=PROCESSING PROCEDURE (INITIALIZING DIVISION: ROW (@stat, Ynew))}
```

FIG. 22B

```
* SET ADD-ON BOARD CONNECTION PATH TO 1
{Yv=MAIN PROGRAM (VARIABLE DECLARATION: ROW (@varDcl))
-Yw=VARIABLE FORMAT (NAME: ADD-ON BOARD CONNECTION PATH)
    →
 Yw=VARIABLE INITIAL VALUE (VARIABLE: VARIABLE FORMAT
                                     (NAME: ADD-ON BOARD CONNECTION PATH,
                                      TYPE: INTEGER TYPE (SIZE: STANDARD)),
                            VALUE: 1)
 YvarSeq=ROW (@varDcl, Yw)}
```

FIG. 22C   24

```
··UPDATING EXPRESSION GENERATION DATA (ROLE PATTERN CHARACTER
    STRING DATA)
    ■=→▲[]《》■
        ·· OMITTED ··
    VARIABLE INITIAL VALUE = [VARIABLE] = [VALUE] ▲
    CONDITIONAL BRANCH = if [CONDITION] {[CONTENT]} ▲
    NON-IDENTICAL VALUE = [RIGHT-HAND SIDE] ≠ [LEFT-HAND SIDE]
    VARIABLE DECLARATION FOR CHARACTER STRING WITH INITIAL VALUE
      = char [NAME] = [VALUE] ▲
```

```
---UPDATING EXPRESSION GENERATION DATA (VOCABULARY
                                    CHARACTER STRING DATA)

■=▲@■

·· OMITTED ··
  OPERATE ADD-ON BOARD = exec ▲
  FFT = fft ▲
  START USING ADD-ON BOARD = open ▲
  ADD-ON BOARD CONNECTION PATH = channelNo ▲
  END USING ADD-ON BOARD = close ▲
  TRUE VALUE = 0 ▲
  STOP AFTER MESSAGE IS PRINTED = {putString('ADD-ON BOARD
                                    EXECUTION ERROR OCCURRED');
  exit(10)} ▲
```

76da
                                                                         /
..BEHAVIOR STRUCTURE DESCRIPTION ROLE TREE REFLECTING TRANSFORMATION DATA..
■-(:,)#■
TOP VIEW - MAIN PROGRAM (
 EXTERNAL PROCEDURE DECLARATION: ROW (),
 VARIABLE DECLARATION: ROW (VARIABLE INITIAL VALUE (
                       VARIABLE: VARIABLE FORMAT (NAME: FFT, TYPE:
                          CHARACTER STRING (SIZE: STANDARD))
                       VALUE: 'fft')
                       ),
 PROCEDURE DIVISION: PROCESSING PROCEDURE (
   INITIALIZING DIVISION: ROW (
     PROCEDURE CALLING (NAME: START USING ADD-ON BOARD,
                       ARGUMENT: VARIABLE (NAME: ADD-ON BOARD
                                                 CONNECTION PATH,
                                           TYPE: INTEGER TYPE
                                                 (SIZE: STANDARD)))
                       ),
   PROCEDURE BODY: MAIN PROCEDURE (
     NAME: TIME-SERIES ANALYSIS ACCORDING TO REAL CEPSTRUM PROCESS,
     CONTENT: ROW (
           .. OMITTED ..
       UNLABELED BLOCK (CONTENT: ROW (
         COMMENT (CONTENT: EFFECT REAL CEPSTRUM ANALYSIS),
         CONDITIONAL BRANCH (
           CONDITION: NON-IDENTICAL VALUE (
             RIGHT-HAND SIDE: PROCEDURE CALLING (
               NAME: OPERATE ADD-ON BOARD,
               ARGUMENT: ROW (
                 VARIABLE (NAME: FFT, TYPE: CHARACTER STRING TYPE
                           (SIZE: STANDARD)),
                 VARIABLE (NAME: N, TYPE: INTEGER TYPE (SIZE:
                           STANDARD)),
                 VARIABLE (NAME: x, TYPE: REAL ARRAY TYPE (SIZE:
                           N)),

FIG. 25A

```
                VARIABLE (NAME: f, TYPE: REAL ARRAY TYPE (SIZE:YN))
                        ),
        LEFT-HAND SIDE: TRUE VALUE),
CONTENT: STOP AFTER MESSAGE IS PRINTED
    )
        -- OMITTED --
    CONDITIONAL BRANCH (
        CONDITION: NON-IDENTICAL VALUE (
            RIGHT-HAND SIDE: PROCEDURE CALLING (
                NAME: OPERATE ADD-ON BOARD,
                ARGUMENT: ROW (
                    VARIABLE (NAME: FFT, TYPE: CHARACTER STRING TYPE
                            (SIZE: STANDARD)),
                    VARIABLE (NAME: N, TYPE: INTEGER TYPE (SIZE:
                            STANDARD)),
                    VARIABLE (NAME: f, TYPE: REAL ARRAY TYPE (SIZE:
                            N)),
                    VARIABLE (NAME: q, TYPE: REAL ARRAY TYPE (SIZE:YN))
                        ),
        LEFT-HAND SIDE: TRUE VALUE),
CONTENT: STOP AFTER MESSAGE IS PRINTED
    )
                )}
)
        -- OMITTED --
                ),
```

```
END PROCESSING DIVISION: ROW (
    PROCEDURE CALLING (NAME: END USING ADD-ON BOARD,
                      ARGUMENT: VARIABLE (NAME: ADD-ON BOARD
                                                CONNECTION PATH,
                                          TYPE: INTEGER TYPE
                                                (SIZE: STANDARD)))
                  )
              )
          )
```

```
CORRECTED ENDING ROLE TREE
■-(:,)■
TOP VIEW - MAIN PROGRAM (
 EXTERNAL PROCEDURE DECLARATION: ROW (
  PROCEDURE FORMAT (NAME: START USING ADD-ON BOARD,
                    ARGUMENT: TYPE NAME ROW (INTEGER TYPE
                              (SIZE: STANDARD))),

PROCEDURE FORMAT (NAME: OPERATE ADD-ON BOARD,
                    ARGUMENT: TYPE NAME ROW (CHARACTER STRING TYPE
                              (SIZE: STANDARD), INTEGER TYPE (SIZE:
                              STANDARD), REAL ARRAY TYPE (SIZE: N),
                              REAL ARRAY TYPE (SIZE: N))),
  PROCEDURE FORMAT (NAME: END USING ADD-ON BOARD,
                    ARGUMENT: TYPE NAME ROW (INTEGER TYPE
                              (SIZE: STANDARD)))
                    )
 VARIABLE DECLARATION: ROW (VARIABLE INITIAL VALUE (
                    VARIABLE: VARIABLE FORMAT (NAME: FFT, TYPE:
                              CHARACTER STRING (SIZE:
                              STANDARD))
                    VALUE: 'fft')
                    VARIABLE INITIAL VALUE (
                    VARIABLE: VARIABLE FORMAT (NAME: ADD-ON
                              BOARD CONNECTION PATH, TYPE:
                              INTEGER TYPE (SIZE: STANDARD))
                    VALUE: 1)
         ·· OMITTED ··
                    ),
```

FIG. 26A

```
PROCEDURE DIVISION: PROCESSING PROCEDURE (
  INITIALIZING DIVISION: ROW (
    PROCEDURE CALLING STATEMENT (NAME: START USING ADD-ON BOARD,
                                 ARGUMENT: VARIABLE NAME ROW
                                     (ADD-ON BOARD CONNECTION PATH))
                ),
  PROCEDURE BODY: MAIN PROCEDURE (
    NAME: TIME-SERIES ANALYSIS ACCORDING TO REAL CEPSTRUM PROCESS
    CONTENT: ROW (
          ·· OMITTED ··
      UNLABELED BLOCK (CONTENT: ROW (
        COMMENT (CONTENT: EFFECT REAL CEPSTRUM ANALYSIS),
        CONDITIONAL BRANCH (
          CONDITION: NON-IDENTICAL VALUE (
            RIGHT-HAND SIDE: PROCEDURE CALLING (
              NAME: OPERATE ADD-ON BOARD,
              ARGUMENT: VARIABLE NAME ROW (FFT, N, x, f)),
            LEFT-HAND SIDE: TRUE VALUE),
      CONTENT: STOP AFTER MESSAGE IS PRINTED
          )
          ·· OMITTED ··,
        CONDITIONAL BRANCH (
          CONDITION: NON-IDENTICAL VALUE (
            RIGHT-HAND SIDE: PROCEDURE CALLING (
              NAME: OPERATE ADD-ON BOARD,
              ARGUMENT: VARIABLE NAME ROW (FFT, N, f, q)),
            LEFT-HAND SIDE: TRUE VALUE),
      CONTENT: STOP AFTER MESSAGE IS PRINTED
          )
                ))
    )
          ·· OMITTED ··
                ),
```

FIG. 26B

```
END PROCESSING DIVISION: ROW (
    PROCEDURE CALLING (NAME: END USING ADD-ON BOARD,
                      ARGUMENT: VARIABLE (NAME: ADD-ON BOARD
                                                CONNECTION PATH)))
            )
        )
    )
```

FIG. 26C   77a

```
-CORRECTED COMPUTER PROGRAM SOURCE CODE ·······························································
void main() {
   extrn exec(char, int, real[N], real[N];  ····
   extrn open(int);                                         ⎫  a
   extrn close(int); ·······························        ⎭
   char fft='fft';
   int channelNo=1;
   int N;
   real x[N];
   real f[N];
   real q[N];
   /*TIME-SERIES ANALYSIS ACCORDING TO REAL CEPSTRUM PROCESS*/
                ·· OMITTED ··
      call open(channelNo); ················b
                ·· OMITTED ··
      {
/*EFFECT REAL CEPSTRUM ANALYSIS*/
      if exec(fft,N,x,f) ≠ 0                                ⎫  c
            {putString('ADD-ON BOARD EXECUTION ERROR OCCURRED');
            exit(10)};                                      ⎭
                ·· OMITTED ··
      if exec(fft,N,f,q) ≠ 0                                ⎫  c
            {putString('ADD-ON BOARD EXECUTION ERROR OCCURRED');
            exit(10)};                                      ⎭
      }
                ·· OMITTED ··
      call close(channelNo); ················b
                ·· OMITTED ··
   exit(0)
         }
```

FIG. 27         76d

PROGRAM GENERATING SYSTEM FOR APPLICATION-SPECIFIC ADD-ON BOARDS USING THE LANGUAGE OF INDIVIDUALS

BACKGROUND OF THE INVENTION

1.) Field of the Invention

The present invention relates to a system for generating a program for an application-specific add-on board using the language of individual persons, and more particularly to a program generating system for rewriting an application program for an application-specific add-on board using the language of individual persons which has been added to a personal computer or a workstation in order to increase the information processing capability thereof.

2.) Description of the Related Art

Personal computers and workstations that are owned by individuals are better than large general-purpose computers which provide shared facilities in that users can use personal computers and workstations any time they want. However, the general information processing capability of personal computers and workstations is lower than that of such large general-purpose computers. One way of increasing the information processing capability of personal computers and workstations is to use an application-specific add-on board called an acceleration card, an expansion card, or the like. When such an application-specific add-on board is added to a personal computer or workstation, the personal computer or workstation is enabled to process information quickly in solving a certain problem addressed by the application-specific add-on board, and can have as much performance as supercomputers. However, use of an application-specific add-on board requires the program for a personal computer or workstation to be rewritten. Since a process of rewriting a program is generally complex to carry out, application-specific add-on boards have not yet found a widespread use in individual's programming work.

FIG. 28 of the accompanying drawings shows the manner in which an add-on board is connected to a personal computer. In FIG. 28, a personal computer 1 has a plurality of input/output device connection mechanisms 2-1, . . . , 2-n which allow the user to connect input/output devices such as a floppy disk drive, a magnetooptical disk device, etc. freely to the personal computer 1. An input/output device 4 having an add-on board 3 is connected to the personal computer 1 through an input/output device connection mechanism 5 and the input/output device connection mechanism 2-1. The add-on board 3 may be used to produce the result f(x) of a certain operation f when the personal computer 1 writes data x into the add-on board 3 and reads the result after a certain period of time.

The recent advance of LSI fabrication technology has made it possible to produce add-on boards in the form of various devices. For example, ASICs (Application-Specific Integrated Circuits) which the users can modify for specific functions have been available in addition to commercially available standard LSI circuits. Another device that is commercially available is a dedicated central processing unit designed for efficiently solving a particular problem such as for signal processing, still/moving image processing, speech recognition, text retrieval, or the like. "Simulation by a dedicated computer" edited by Daiichiro Sugimoto, published by Asakura Shoten in 1994 has revealed an add-on board dedicated for gravity calculations. The disclosed add-on board is designed to carry out calculations to sum forces that are inversely proportional to the square of a distance, and is implemented by a standard LSI circuit or an ASIC. Calculations to sum gravitational forces produced by a plurality of stars, e.g., about ten thousand stars, would be a very burdensome task for a computer, and can be processed in a highly shortened period of time by the add-on board.

Solving a problem with a personal computer can be a three-step process. According to the three-step process, an algorithm which is used only by a software program is established in a first step, and a portion, which imposes a large calculative burden, of the software program based on the established algorithm is transferred into an add-on board dedicated to perform calculations in a second step. Then, in a third step, the add-on board is updated depending on the magnitude of a problem to be solved thereby.

While various devices have been available as add-on boards, no effective support devices have been proposed for carrying out processes of rewriting application problems which are required by transitions from the first step to the second step and from the second step to the third step. It has therefore been necessary to either manually update a program as required by the addition of an add-on board or newly generate an application program for an add-on board which is added. However, the manual process of updating a program is highly tedious and time-consuming, and tends to cause errors. The latter approach is also problematic in that since different application programs are written for different add-on boards even if they have the same application object, the maintenance and management of the application programs is complicated, and that any procedure for redeveloping portions of the application programs which do not depend on the add-on boards is a task that is not essentially necessary to correct the programs as required by the addition of the add-on boards.

At present, either rewriting or newly generating an application program as required by the addition of an add-on board is highly expensive. As a result, add-on boards have not been widespread though a wide selection of hardware arrangements is available to the user.

A specific example in which a process of updating an application program as required by the addition of an add-on board is complex will be described below. Rewriting a program is complex because one rewriting event requires other rewriting events, i.e., a chain of rewriting events occurs. In a process of rewriting a program due to such a chain of rewriting events, codes at distant positions on the program may need to be rewritten. As a consequence, for a rewriting person to complete the rewriting of a program, it is necessary to find all rewriting locations scattered in a wide range on the program and rewrite the program in those rewriting locations without error. Such a procedure is, however, tedious, time-consuming, and burdensome for the rewriting person.

FIG. 29 of the accompanying drawings shows, by way of example, a chain of rewriting events in a process of rewriting a program. In FIG. 29, P1 represents a program that is present before an add-on board is added or updated, and P2 represents a program that is rewritten according to an add-on board added or updated. In the example shown in FIG. 29, the programs P1, P2 are described using a language which has a syntax similar to that of the C language. However, the syntax of the used language contains rules different from those of the C language in order to avoid situations in which transformation rules would excessively be complicated.

In FIG. 29, a Fourier transform subprogram "fft" referred to in a certain signal processing program is rewritten into a program "exec" for carrying out a Fourier transform, using an add-on board. One rewriting event in the program P1 causes seven rewriting events of five types to occur in the program P2. Specifically, rewriting a statement "call fft(N, x,f)" in the program P1 induces rewriting events of the following five types (1)–(5):

(1) A command "fft" representing an operation to be carried out by the add-on board is written as an argument of "exec".

(2) A statement "call open" for instructing the computer to start using the add-on board and a statement "call close" for instructing the computer to end using the add-on board are added to necessary positions.

(3) A number identifying an input/output connection mechanism to which the add-on board is connected is indicated as an argument with respect to "open" and "close" given above. In the example, "1" representative of a first channel is indicated.

(4) The result of an execution by the add-on board is determined. If an execution error has occurred, then a code corresponding to the execution error is added.

(5) The declaration "fft" is deleted, and instead the declarations "exec", "open", and "close" are added.

The above rewriting events take place at distant positions on the program. Specifically, the event (1) causes a code positioned in an execution procedure division to be rewritten. The "open" in the event (2) causes a code in an initializing division to be rewritten, and the "close" in the event (2) causes a code positioned in an end processing division to be rewritten. The rewriting in the event (3) is rewriting with respect to both "open" and "close", and requires a correct number to be indicated since different computers can take different numbers, respectively. In this example, the event (4) occurs at a position where an fft program is rewritten into an exec program in the execution procedure division. Processes of generating various codes may be available other than the above process of adding a code for stopping the operation after displaying an operation error of the add-on board. Details of such processes need to be specified by the user. In the event (5), codes are rewritten in a declaration division.

As described above, when an application program is rewritten as required by the addition of an add-on board for increasing the information processing capability of a computer, one rewriting event requires a plurality of other rewriting events, i.e., a chain of rewriting events occurs. Inasmuch as such rewriting events occur at distant positions on a source program, the program rewriting procedure is tedious, time-consuming, and burdensome for the rewriting person.

SUMMARY OF THE INVENTION

It is therefore an object of the present invention to provide a system for generating a program for an application-specific add-on board using the language of individuals, the system allowing a program to be automatically rewritten when such an application-specific add-on board is used.

To achieve the above object, there is provided in accordance with the present invention a program generating system for rewriting a program using an individual's language upon addition of an application-specific add-on board, comprising means for updating transformation data to generate updated transformation data described in a role tree format for indicating rewriting the program upon addition of the application-specific add-on board, and means for generating a program using the individual's language by correcting a role pattern and role assignment knowledge used to generate an original program from an initial document of the program to be rewritten, with the updated transformation data generated by the transformation data updating means, for thereby generating a rewritten program as required by the addition of the application-specific add-on board from the initial document.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 9 is a diagram showing an example of the content of an initial document;

FIG. 10 is a diagram showing the content of an initial role tree;

FIG. 11 is a diagram showing the content of a set of vocabulary transformation rules;

FIG. 12 is a diagram showing the content of a beginning role tree;

FIG. 13 is a diagram showing the content of a computation structure description role tree;

FIG. 14 is a diagram showing the content of a set of transformation rules for realizing a computation structure, as applied to a third-1 processor;

FIGS. 15A and 15B are diagrams showing the content of a behavior structure description role tree;

FIGS. 16A and 16B are diagrams showing the content of a set of transformation rules for realizing a computation structure as applied to a third-2 processor;

FIGS. 17A and 17B are diagrams showing the content of an ending role tree;

FIGS. 18A and 18B are diagrams showing the content of a set of transformation rules for realizing a computation structure of computer programs, as applied to a third-3 processor;

FIG. 19 is a diagram showing the content of a computer program source code;

FIG. 20 is a diagram showing the content of a set of patterns as applied to a fourth processor;

FIGS. 22A, 22B, and 22C are diagrams showing updating transformation data for rewriting an original program;

FIG. 23 is a diagram showing a pattern addition of updating expression generation data for rewriting an original program;

FIG. 24 is a diagram showing a vocabulary addition of updating expression generation data for rewriting an original program;

FIGS. 25A, 25B, and 25C are diagrams showing the content of a behavior structure description role tree reflecting updated transformation data;

FIGS. 26A, 26B, and 26C are diagrams showing the content of a corrected ending role tree;

FIG. 27 is a diagram showing a corrected computer program source code;

DETAILED DESCRIPTION OF THE PREFERRED EMBODIMENT

Figure 1:
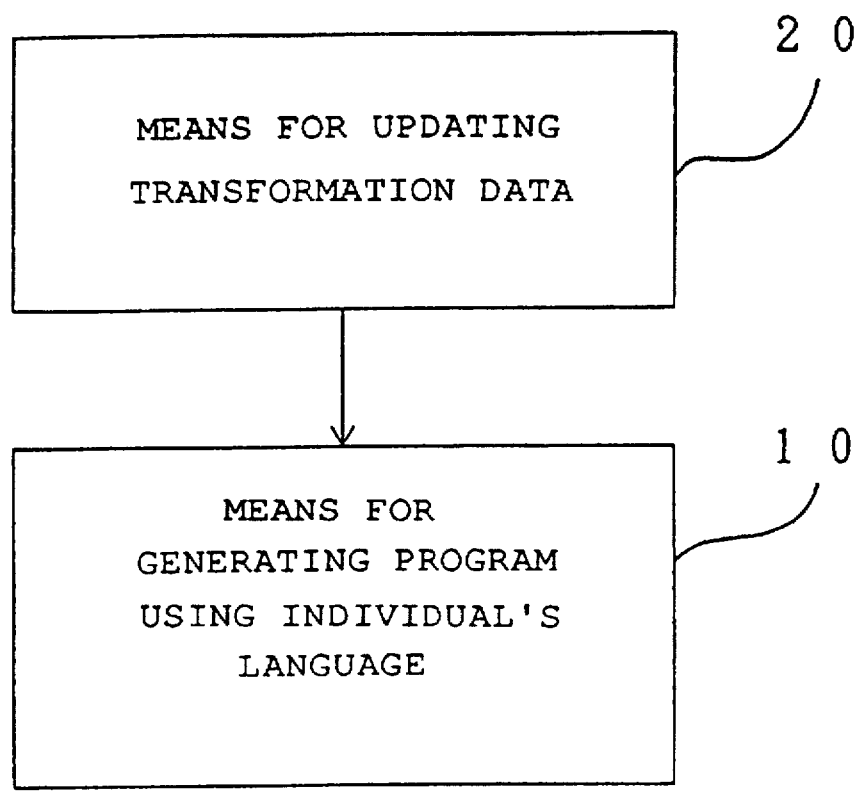
FIG. 1 is a block diagram showing the principles of a system for generating a program for an application-specific add-on board using the language of individuals according to the present invention.

FIG. 1 shows in block form the principles of a system for generating a program for an application-specific add-on board using the language of individuals according to the present invention. As shown in FIG. 1, the system according to the present invention generally comprises a means 10 for generating a program using an individual's language and a means 20 for updating transformation data and supplying the transformation data for indicating the rewriting of a program as required by the addition of an add-on board to the program generating means 10.

The program generating means 10 is based on a language transforming apparatus using a knowledge base, and serves to transform an initial document described using an individual's language into a program for a computer with an add-on board mounted thereon according to given role patterns and role assignment knowledge. The transformation data updating means 20 serves to correct role patterns and role assignment knowledge used to generate, from the initial document, an original program for the computer before the add-on board is mounted thereon, as required to generate a program that is rewritten because of the addition of the add-on board. As a result, the system can generate a program which is applied to the given initial document by the program generating means 10 and rewritten for the computer with the add-on board mounted thereon.

Figure 2:
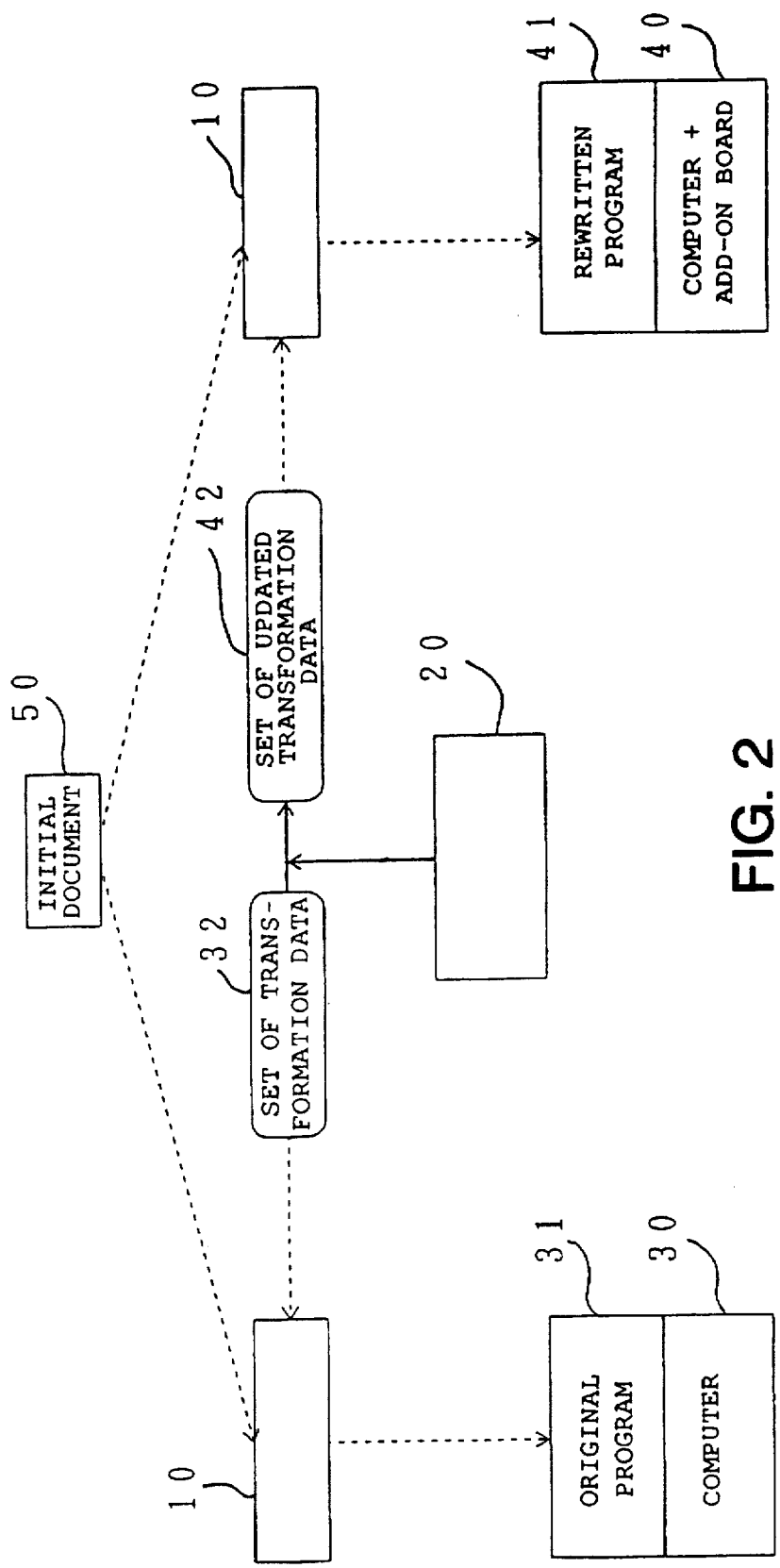
FIG. 2 is a block diagram illustrative of the manner in which a program is rewritten.

FIG. 2 is illustrative of the manner in which a program is rewritten. In FIG. 2, a program for a computer 30 before an add-on board is added thereto is referred to as an original program 31, and a program for a computer 40 to which an add-on board has been added is referred to as a rewritten program 41. The original program 31 is generated by transforming an initial document 50 with the program generating means 10 that employs the individual's language. A set 32 of transformation data representing role patterns and role assignment knowledge is applied to the program generating means 10. The rewritten program 41 which has been rewritten as required by the addition of the add-on board is generated from the initial document 50 for the original program 31 to be rewritten, by the program generating means 10. At this time, a set 42 of updated transformation data produced by correcting the set 32 of transformation data for the original program 31 with the transformation data updating means 20 is applied to the program generating means 10.

In this manner, the program rewriting as required by the addition of the add-on board is carried out by the program generating means 10, using the initial document 50 needed to generate the original program 31 and the updated transformation data 42 produced by correcting the set 32 of transformation data needed to generate the original program 31, thereby generating the rewritten program 41.

If the original program 31 is generated by the program generating means 10, then the initial document 50 and the set 32 of transformation data which are required to generate the original program 31 are used because they have already been given. If the original program 31 is not generated by the program generating means 10, then the original program 31 can be rewritten into an initial document 50 thereby to produce the initial document 50 by the program generating means 10.

Figure 3:
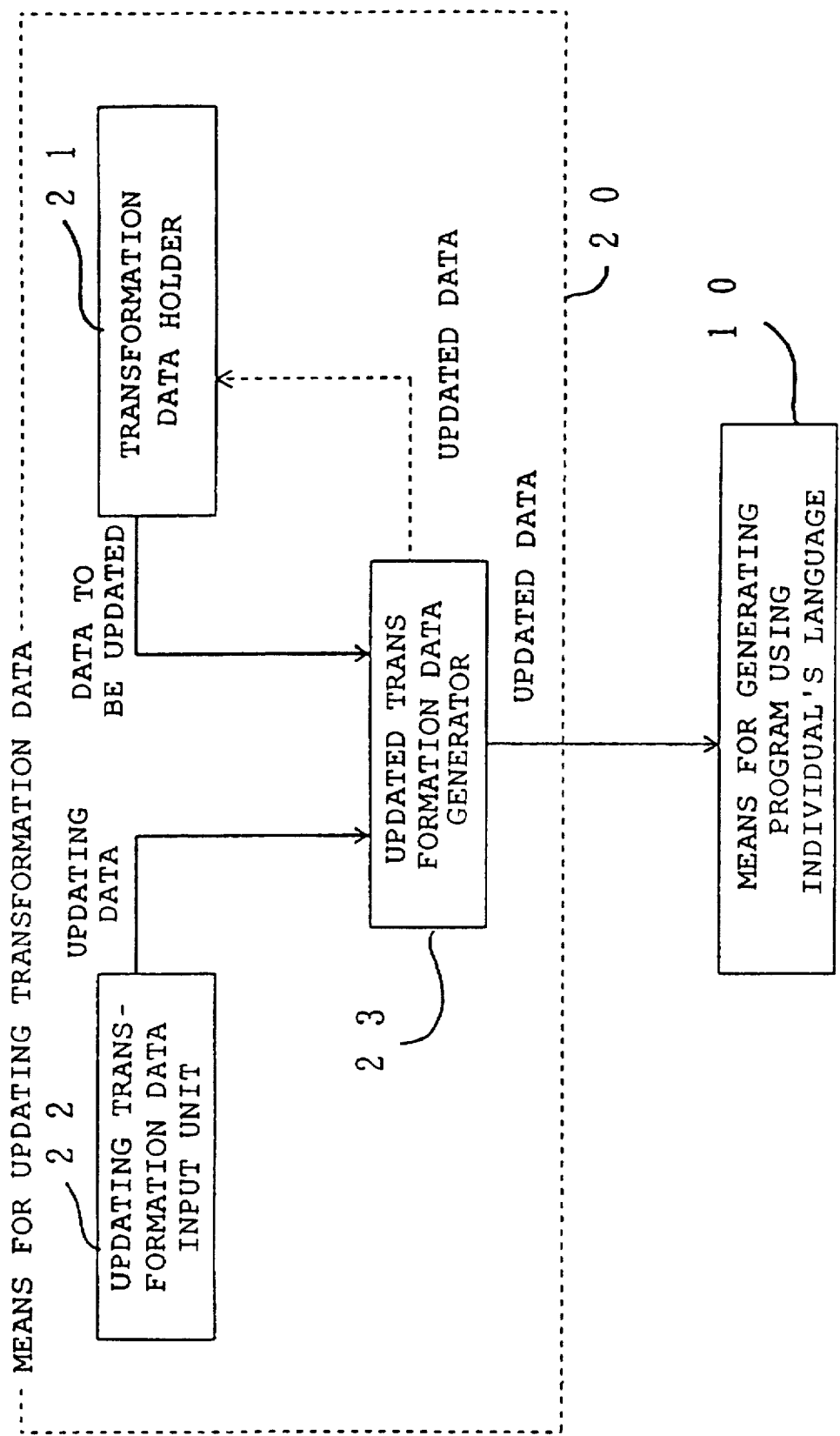
FIG. 3 is a block diagram showing details of a means for updating transformation data.

FIG. 3 shows the transformation data updating means 20 in detail. As shown in FIG. 3, the transformation data updating means 20 comprises a transformation data holder 21, an updating transformation data input unit 22, and an updated transformation data generator 23. The transformation data holder 21 holds all transformation data that have been used in the updating of the add-on board up to a certain time, together with the number of times that the add-on board is updated. When the add-on board is added, the data held by the transformation data holder 21 before being updated are read and reused for generating updated transformation data. When updated transformation data are generated, the updated transformation data are held by the transformation data holder 21 in preparation for a next updating cycle. The updating transformation data input unit 22 inputs transformation data indicative of rewriting of the original program as required by the updating of the add-on board. The updated transformation data generator 23 updates the transformation data, before being updated, held by the transformation data holder 21 for generating the original program, using the transformation data indicative of rewriting of the original program from the updating transformation data input unit 22. The updated data thus generated are outputted to the program generating means 10, and returned to and held by the transformation data holder 21.

The program generating means 10 is constructed on the basis of a language transforming apparatus using a knowledge base, which is capable of transforming a first linguistic description described with a language used in an application field into a second linguistic description such as of a given computer program language or the like. First, such a language transforming apparatus using a knowledge base will be described below.

Figure 4:
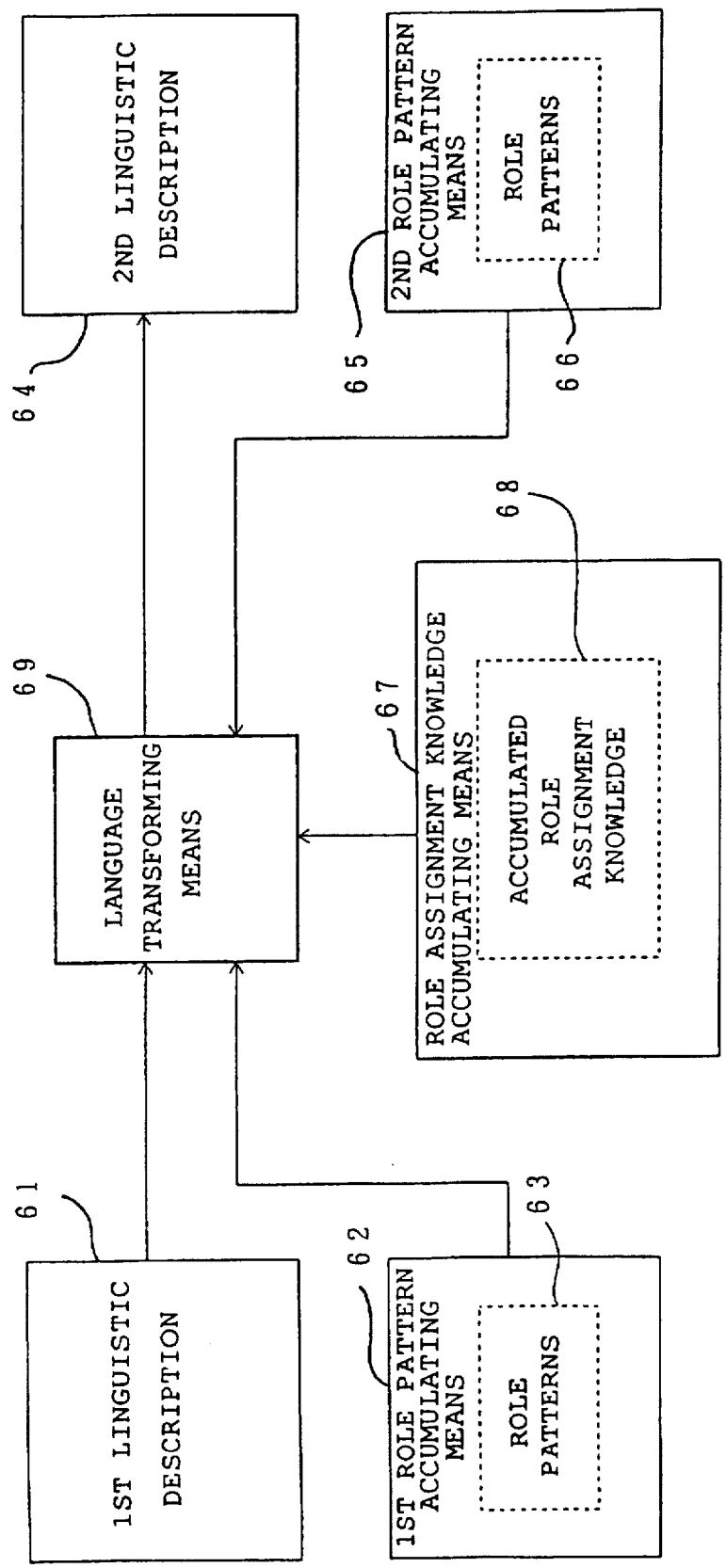
FIG. 4 is a block diagram of a basic arrangement of a language transforming apparatus using a knowledge base.

FIG. 4 shows in block form a basic arrangement of a language transforming apparatus using a knowledge base. As shown in FIG. 4, the language transforming apparatus comprises a first linguistic description 61, a first role pattern accumulating means 62 for accumulating role patterns 63, a second linguistic description 64, a second role pattern accumulating means 65 for accumulating other role patterns 66, a role assignment knowledge accumulating means 67 for accumulating role assignment knowledge 68 representing the corresponding relationship between the role patterns 63, 66 which are accumulated by the first and second role pattern accumulating means 62, 65, and a language transforming means 69 for transforming the first linguistic description 61 into the second description 64 by referring to the role patterns 63, 66 and the role assignment knowledge 68.

The language transforming means 69 of the language transforming apparatus uses the role patterns 63 for understanding the first linguistic description 61, and the first role pattern accumulating means 62 for accumulating the role patterns 63, also uses the role patterns 66 for understanding the second linguistic description 64, and the second role pattern accumulating means 65 for accumulating the role patterns 66, and refers to the role assignment knowledge 68 indicative of the relationship between the roles in the role patterns of the first and second linguistic descriptions 61, 64, and the role assignment knowledge accumulating means 67 to make it possible to obtain the desired second linguistic description 64 from the given first linguistic description 61.

The program generating means 10 may be arranged using the system disclosed in International Application No. PCT/JP93/01331 entitled "A system for generating a program using the language of individual persons". The disclosed system is constructed by adding, to a language transforming apparatus using a knowledge base, two creative concepts, i.e., a specific arrangement of a language transforming means and a proposed programming process. Now, a system for generating a program using the language of individuals, which is a specific arrangement of the language transforming means, will be described below.

Figure 5:
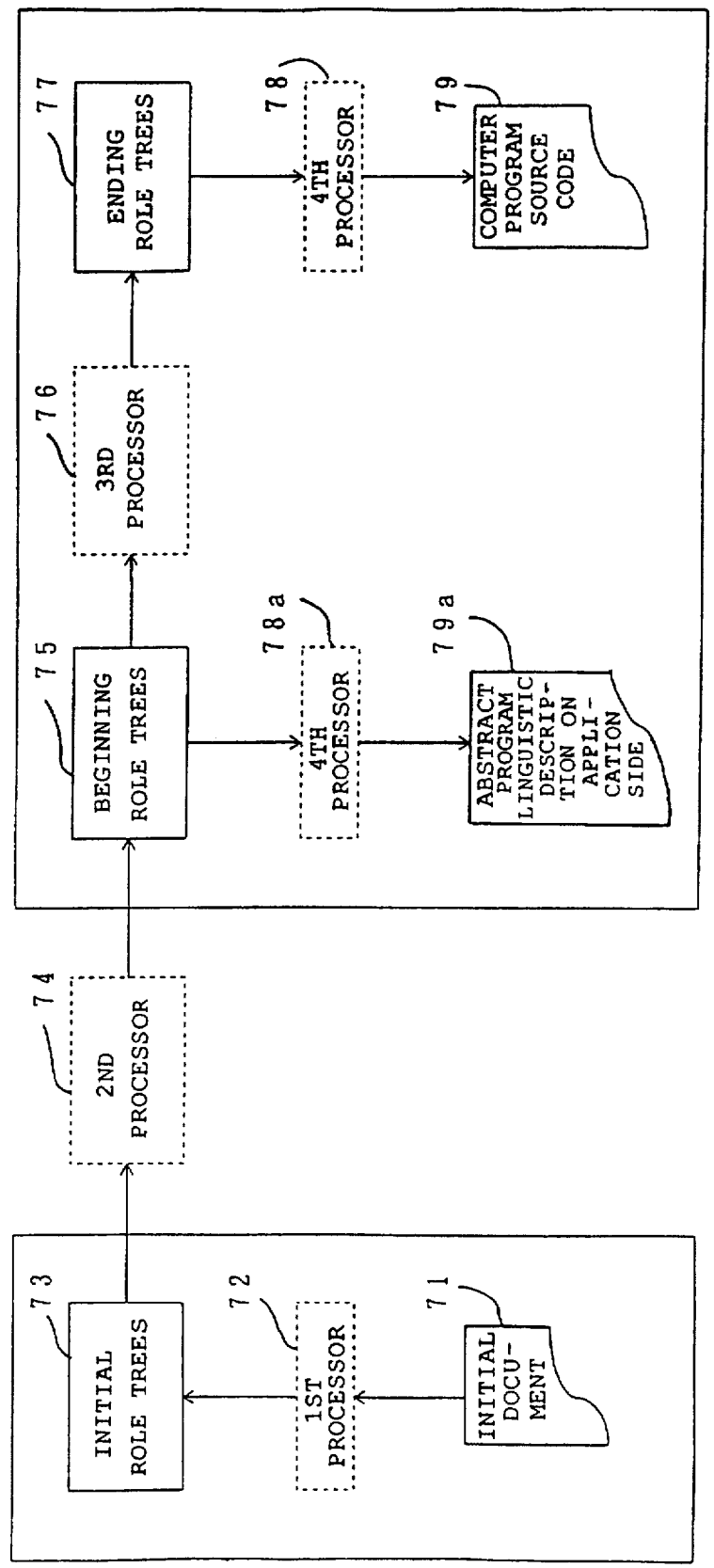
FIG. 5 is a block diagram of a system for generating a program using the language of individuals.

FIG. 5 shows in block form a system for generating a program using the language of individuals. As shown in FIG. 5, the system for generating a program using the language of individuals, which is based on the language transforming apparatus using the knowledge base, primarily comprises a first processor 72 for transforming an initial document, a second processor 74 for transforming a vocabulary, a third processor 76 for transforming a role tree, and fourth processors 78, 78a for generating expressions.

The first processor 72 serves to effect an intermediate description generating process for producing an information processing description intermediate output from an information processing linguistic description. Specifically, the first processor 72 transforms an initial document 71 described by an individual's language into initial role trees 73 which perform the role of expression units in an information processing linguistic description and describe the structure of a string of characters substantially corresponding to a sentence, using role patterns relative to a method of constructing linguistic expressions in the individual's language.

The second processor 74 serves to effect an intermediate output detailing process for adding a partial role tree structure to a leaf-node part of the information processing description intermediate output, producing another information processing description intermediate output. Specifically, the second processor 74 replaces expression units in the initial role trees 73 produced by the first processor 72, which substantially correspond to a sentence in the information processing linguistic description, with the corresponding structure of a role to be performed by an object, i.e., a role pattern, thereby generating beginning role trees 75.

The third processor 76 serves to effect an intermediate output transforming process for transforming the tree structure of the information processing description intermediate output into a computer program intermediate output. Specifically, the third processor 76 transforms the information processing description intermediate output of the beginning role trees 75 into the structure of role trees, using the role assignment knowledge, thereby generating ending role trees 77.

The program generating system disclosed in the above International Application employs transformation rules each composed of a pre-conditional part and a post-conditional part, as a means for expressing the role assignment knowledge. In the disclosed program generating system, a role tree transforming mechanism based on the role assignment knowledge (transformation rules) is achieved as follows: First, the transformation rules are given as a row of rules to the third processor. Secondly, the transformation rules are applied to role trees in the order in which they are given to the intermediate output transforming processor, and one rule is repeatedly applied until it fails to be applied to the role trees. Thirdly, the third processor constructs a partial role tree from the information produced by applying the pre-conditional part of the role tree transformation rule and also from the post-conditional part of the rule. Fourthly, the third processor forcibly adds the constructed partial role tree to a role tree to be transformed. The process of forcibly adding the constructed partial role tree is a construction method in adding the partial role tree to ensure that restrictive conditions will always be satisfied for the role tree to have a tree structure. If the restrictive conditions for the role tree are broken by forcibly adding the constructed partial role tree, then a new partial role tree is added, and the partial role tree that is responsible for inducing the contradiction on the side of the role tree to be transformed is deleted.

The fourth processors 78, 78a serve to effect a linguistic description generation process for producing a computer program linguistic description or an abstract program linguistic description on an application side from the computer program intermediate output or the information processing description intermediate output. Specifically, the fourth processor 78 associates a string of characters corresponding to a portion of the computer program with the computer program intermediate output of the ending role trees 77, for thereby generating a computer program source code 79 written by the programming language, and the fourth processor 78a generates an abstract program linguistic description 79a on an application side from the information processing description intermediate output of the beginning role trees 75.

Next, the proposed programming process, which is the other creative concept, added to the language transforming apparatus using the knowledge base for constructing the program generating system using the individual's language will be described below.

Figure 6:
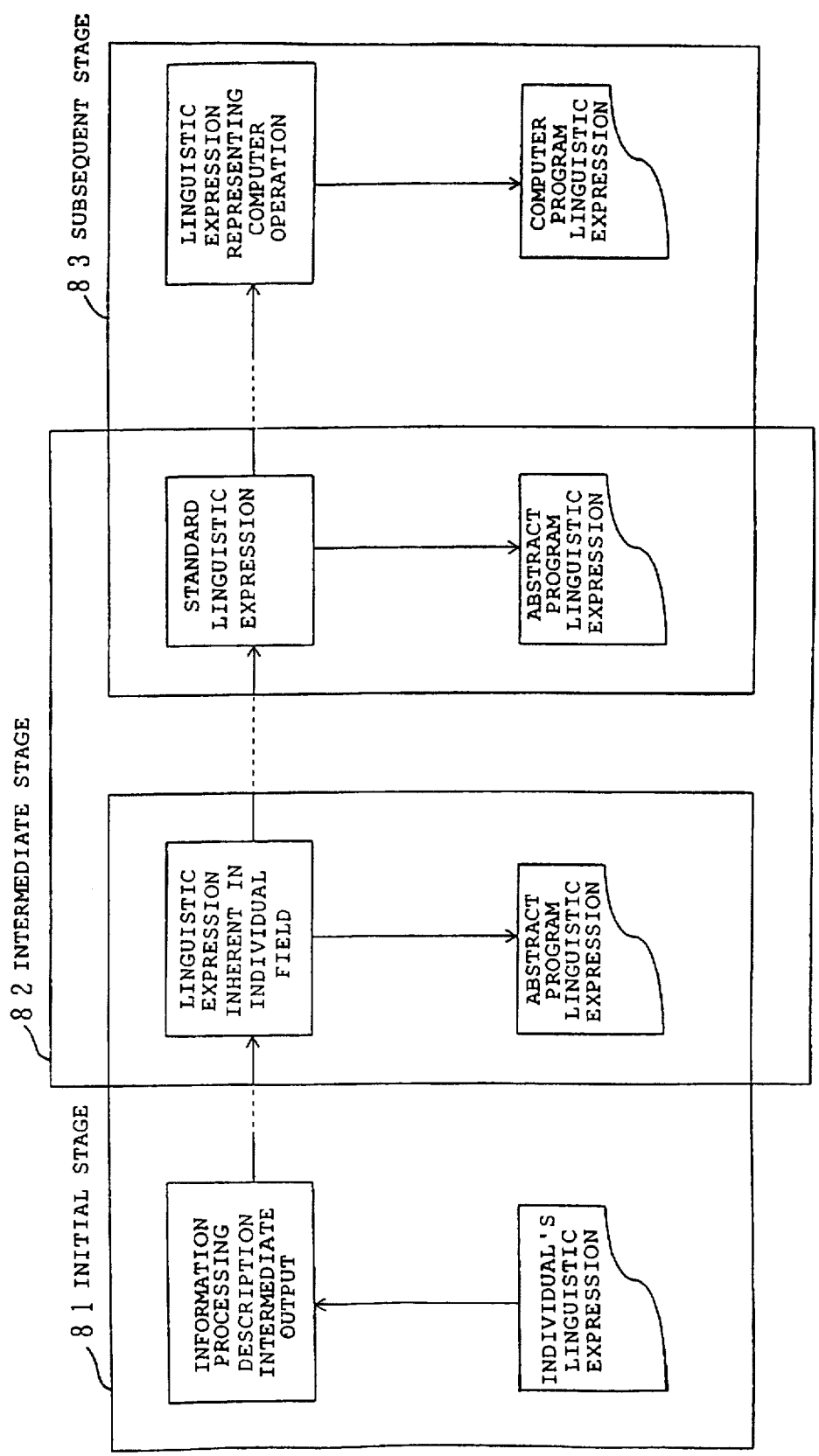
FIG. 6 is a block diagram illustrating a programming process based on the system for generating a program using the language of individuals.

FIG. 6 shows the programming process based on the system for generating a program using the language of individuals. According to this programming process, the processing in the third and second processors is applied a plurality of times to transform an information processing linguistic description written by the language of the user into a computer program linguistic description.

According to the transformation process shown in FIG. 6, an information processing description intermediate output (role tree) representing the structure of an individual's linguistic expression is transformed into an information processing description intermediate output (role tree) corresponding to a linguistic expression inherent in a field in an initial stage 81. In an intermediate stage 82, the information processing description intermediate output corresponding to the linguistic expression inherent in the field is transformed into an information processing description intermediate output (role tree) corresponding to a standard linguistic expression. In a subsequent stage 83, the information processing description intermediate output corresponding to the standard linguistic expression is transformed into an information processing description intermediate output (role tree) corresponding to a linguistic expression indicative of a computer operation, finally obtaining a computer program linguistic description expressed by the given programming language. In each of the stages of the third processor, an abstract program linguistic expression can be obtained by using the fourth processor which effects a linguistic description generation process.

Figure 7:
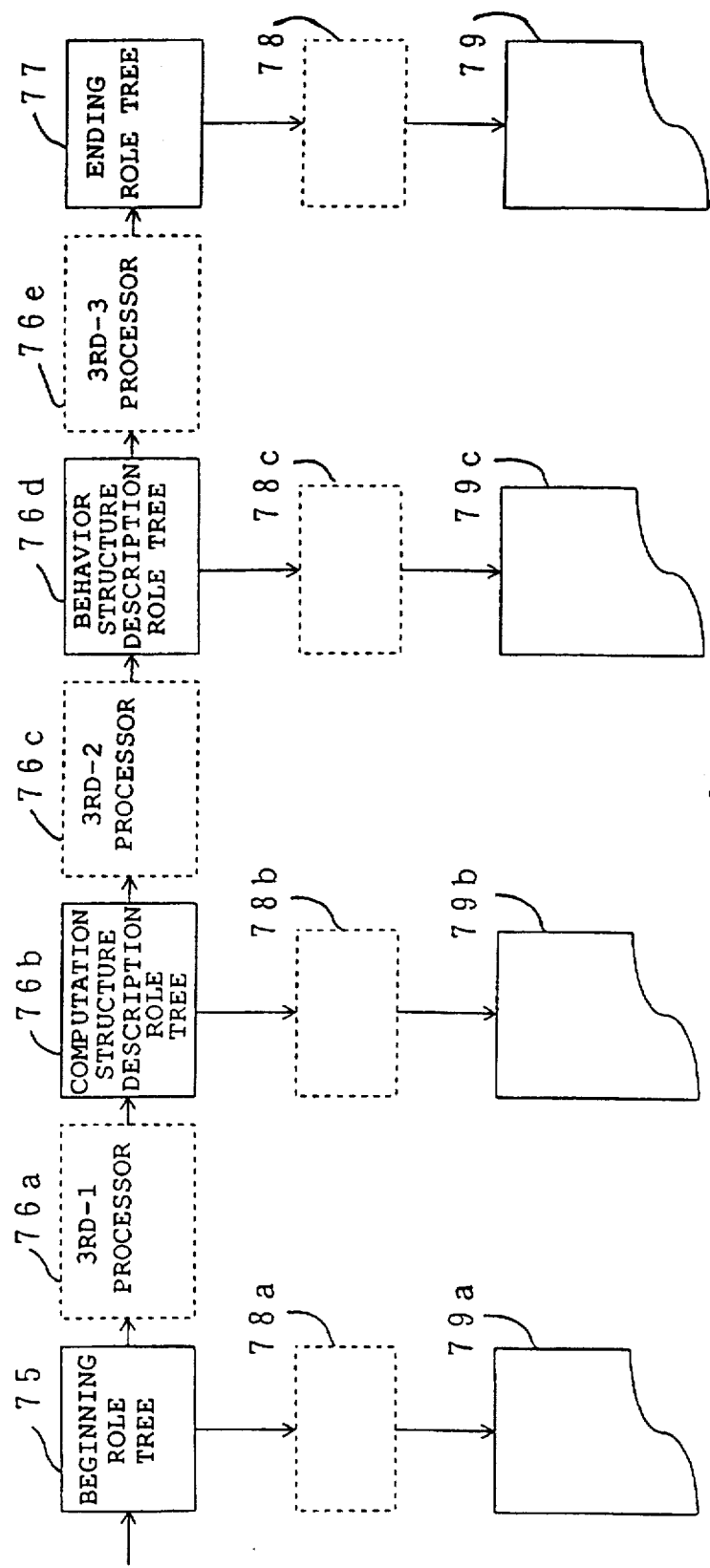
FIG. 7 is a block diagram showing details of a role tree transformation procedure of a third processor.

FIG. 7 shows details of a role tree transformation procedure that is carried out by the third processor. In the program generating system disclosed in the above International Application, the third processor for processing beginning role trees is arranged to effect transformation processes at three stages. Specifically, the third processor is composed of a third-1 processor 76a for transforming the beginning role tree 75 into a role tree to generate a computer program structure, a third-2 processor 76c for transforming a computation structure description role tree 76b which has been generated by the third-1 processor 76a and is descriptive of the computer program structure into a role tree to describe an implementing procedure, i.e., for effecting a transformation process for specifying an implementation method for computation, and a third-3 processor 76e for transforming a behavior structure description role tree 76d which has been generated by the third-2 processor 76c and is descriptive of a computer program computation structure into a role tree to describe a process relative to the development of a standard part, i.e., for effecting a transformation process for realizing a computation structure of a computer program, to generate an ending role tree 77. From the ending role tree 77 is generated a computer program source code 79 through the linguistic description generating process by the fourth processor 78. In addition, it is possible to generate an abstract program linguistic description 79a on an application side from the beginning role tree 75 through the linguistic description generating process by the fourth processor 78a, generate a computation structure description 49b for implementing a computer program from the computation structure description role tree 76b through the linguistic description generating process by a fourth processor 78b, and generate an abstract program linguistic description 79c for a computer side from behavior structure description role tree 76d through the linguistic description generating process by a fourth processor 78c.

The third-1 processor 76a in the first stage transforms the structure of an initial document into the structure of a document (abstract program) which expresses a computation procedure in an individual's language. The third-2 processor 76c in the second stage associates the abstract program with a computer operation thereby to realize the abstract program. The third-3 processor 76e in the third stage transforms a structure required to generate a program written by a certain programming language from the structure of the computer operation which has been obtained in the second stage. When a programming language of such specifications which require variables and subprograms to be referred to and declared is used, if variables and subprograms referred to are not declared, then it is transformed as by inserting declared variables and subprograms in necessary positions.

If a program needs to be rewritten due to the introduction of an add-on board for the reason that a computer operation associated with an abstract program is modified, then a transformation processor to be modified is the processor in the second stage among the processors in the first through third stages. If subprograms are newly introduced as a result of the transformation carried out in the second stage, then the names of these subprograms in a prescribed programming language are added to the data of the fourth processor, so that the subprograms can be written on the program.

Figure 8:
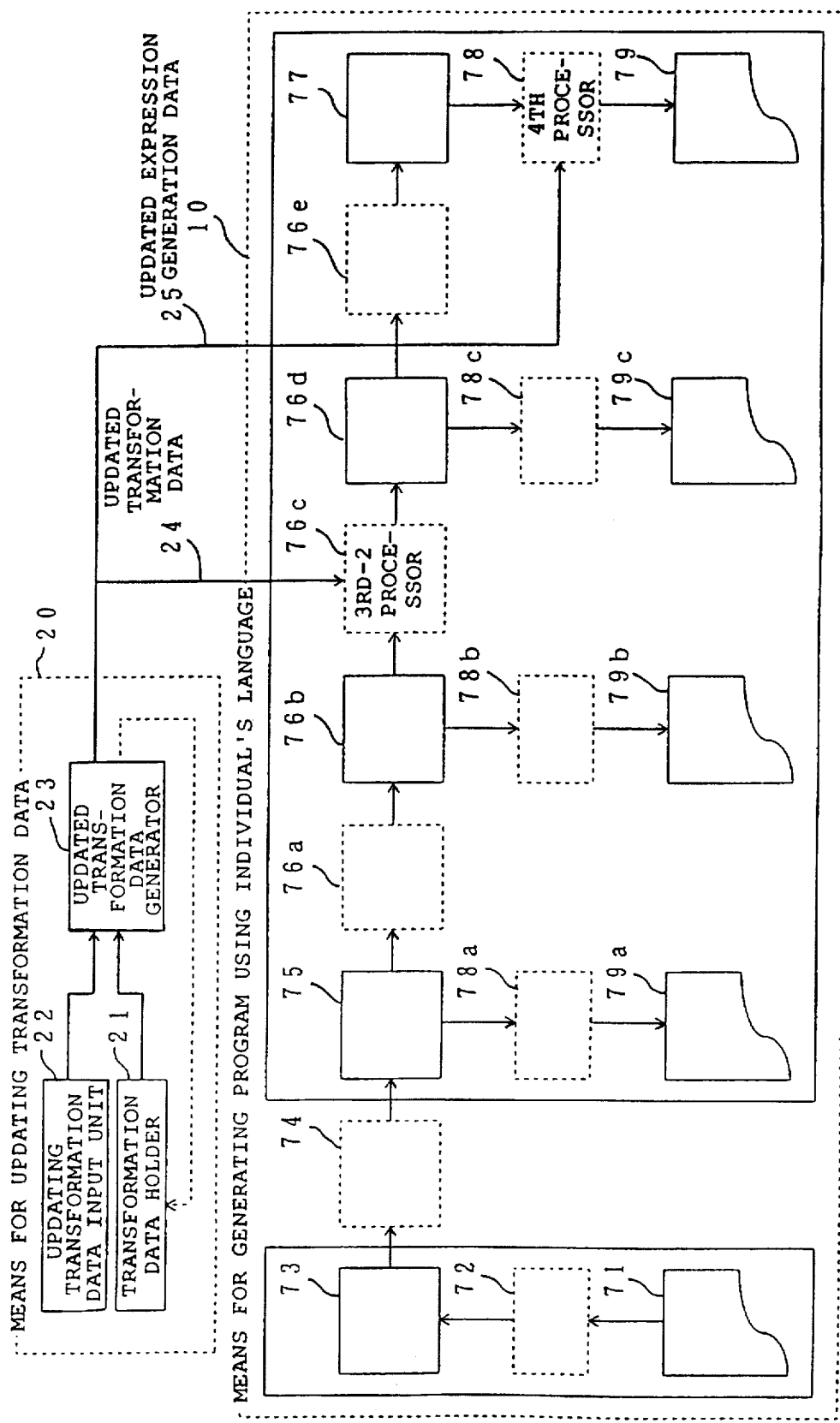
FIG. 8 is a block diagram showing details of a system for generating a program for an application-specific add-on board using the language of individuals.

FIG. 8 shows in block form details of a system for generating a program for an application-specific add-on board using the language of individuals. In FIG. 8, updated transformation data 24 generated by the transformation data updating means 20, i.e., an updated portion of the transformation data for rewriting the original program, is given to the third-2 processor 76c of the third processor for effecting a transformation process for specifying an implementation method for computation, and modifies role tree transformation rules which correspond to the role pattern and role assignment knowledge applied to the third-2 processor 76c. Updated expression generation data 25 generated by the transformation data updating means 20, i.e., an updated portion of the expression generation data for rewriting the original program, is given to the fourth processor 78, and added to the set of patterns and the vocabulary set which correspond to the role pattern and role assignment knowledge applied to the fourth processor 78.

Figure 29:
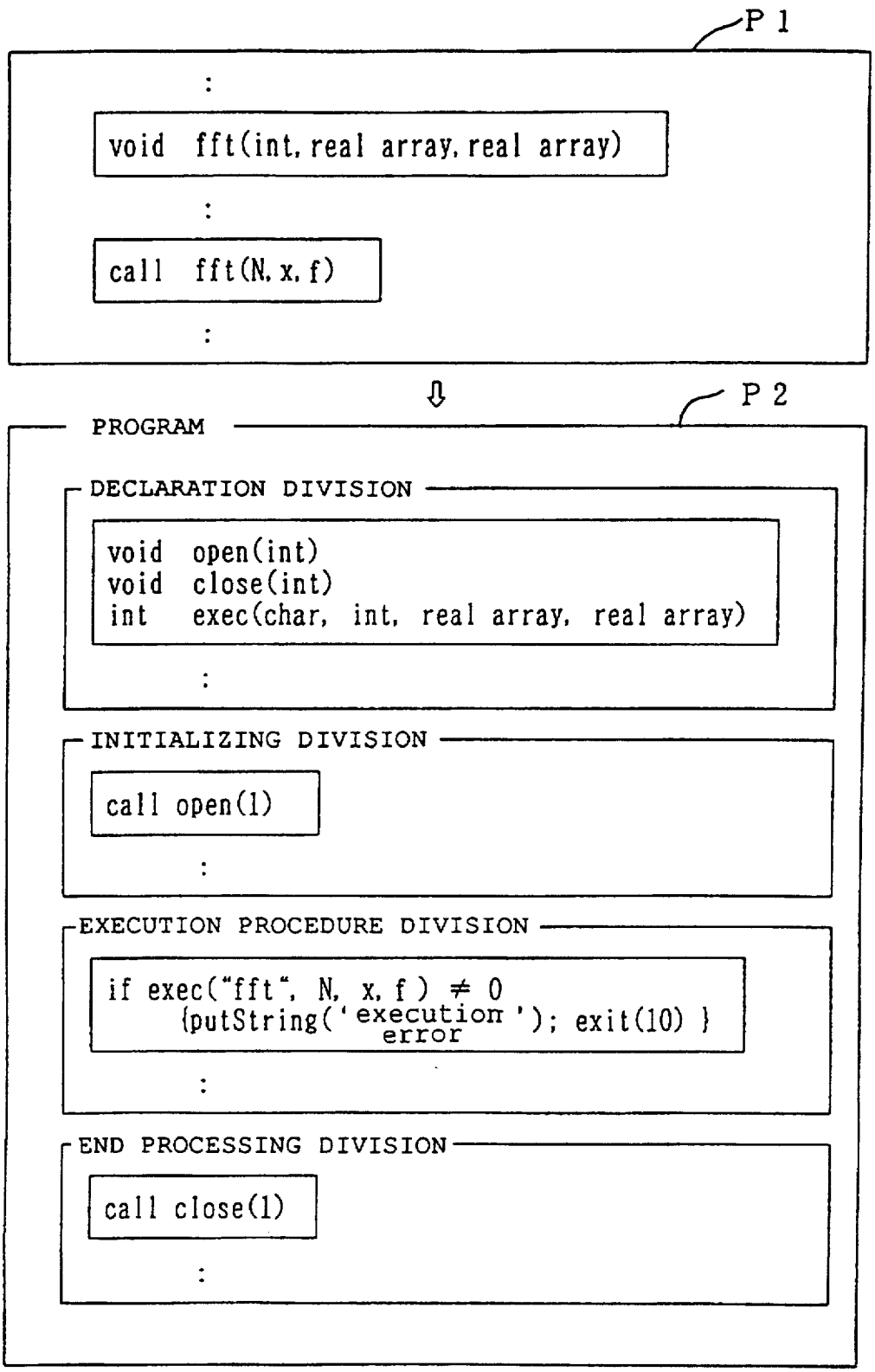
FIG. 29 is a diagram showing, by way of example, a chain of rewriting events in a process of rewriting a program.

A specific example in which the rewriting of an application program as required by the addition of an add-on board, as shown in FIG. 29, is carried out by the system for generating a program for an application-specific add-on board using the language of individuals will be described below.

FIG. 9 shows an example of the content of an initial document 71. It is assumed that the programs P1, P2 shown in FIG. 29 are part of a program that is generated from the initial document 71. The initial document 71 is descriptive of a known signal analyzing procedure called a cepstrum analysis. The expression "DETERMINE FREQUENCY COMPONENT f OF TIME SERIES x COMPOSED OF N POINTS" is noted, and will be described as a reference expression below. It is assumed that the original program P1 to be rewritten has been generated using program generation data using the language of individuals in the manner described below.

FIG. 10 shows the content of an initial role tree 73. The initial role tree 73 is generated from the initial document 71 by the first processor 72. A study of the initial role tree 73 indicates that the structure of a string of character trains divided by the period "." is transferred as it is from the initial document 71 into the initial role tree 73.

FIG. 11 shows the content of a set 74a of vocabulary transformation rules. The set 74a of vocabulary transformation rules is applied to the second processor 74 for detailing the initial role tree 73. According to the set 74a of vocabulary transformation rules, the second processor 74 details the initial role tree 73 to generate a beginning role tree 75.

FIG. 12 shows the content of the beginning role tree 75. According to the beginning role tree 75 generated by detailing the initial role tree 73 with the second processor 74, the reference expression on the initial role tree is transformed into a role pattern "FREQUENCY ANALYSIS (NUMBER OF DATA: N, TIME SERIES: x, FREQUENCY COMPONENT: f)" by the set 74a of vocabulary transformation rules.

The beginning role tree 75 is processed in three stages by the third processor. In the first stage, the third-1 processor 76a effects the transformation process for realizing a program structure to generate a computation structure description role tree 76b.

FIG. 13 shows the content of the computation structure description role tree 76b. According to the computation structure description role tree 76b generated as a result of the transformation process for realizing a program structure, the content of the beginning role tree 75 is assigned to a processing procedure body in a "procedure division" of a role pattern representing the program structure. Since elements other than the processing procedure body are undefined in this stage, the structure of a blank row is assigned to them. This transformation process is carried out according to a set 76aa of transformation rules for realizing a computation structure given below.

FIG. 14 shows the content of the set 76aa of transformation rules for realizing a computation structure, which is applied to the third-1 processor. The set 76aa of transformation rules for realizing a computation structure is applied as a set of role tree transformation rules to the third-1 processor 76a. When the third-1 processor 76a carries out the transformation process for realizing a program structure, the beginning role tree 75 is transformed according to the set 76aa of transformation rules for realizing a computation structure.

In the second stage of the third processor, the third-2 processor 76c assigns a role pattern representing the structure of a computer operation to the role pattern appearing on the computation structure description role tree 76b obtained in the first stage, thereby detailing the abstract program.

FIGS. 15A and 15B show the content of a behavior structure description role tree 76d. According to the behavior structure description role tree 76d which is generated as a result of the transformation process for specifying an implementation method for computation, it is indicated that the reference expression is to be executed by a procedure calling in the name of a frequency analysis. This transformation process is carried out according to a set 76ca of transformation rules for realizing a computation structure given below.

FIGS. 16A and 16B show the set 76ca of transformation rules for realizing a computation structure, which is applied to the third-2 processor. The set 76ca of transformation rules for realizing a computation structure is applied as a set of role tree transformation rules to the third-2 processor 76c. When the third-2 processor 76c carries out the transformation process for realizing a program structure, the computation structure description role tree 76b is transformed according to the set 76ca of transformation rules for realizing a computation structure. It is to be noted that according to these transformation rules, it is indicated that input/output data are to be represented in an array as rules relative to the use of a procedure referred to as a frequency analysis.

In the third step of the third processor, the behavior structure description role tree 76d generated in the second stage is scanned, and if any declarations required on the specifications of a target programming language are missing, such declarations are supplied, generating an ending role tree 77.

Figure 17B:
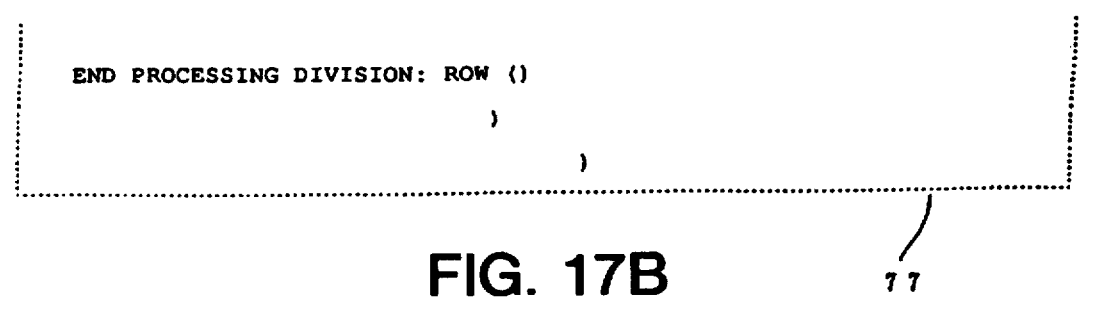

FIGS. 17A and 17B show the content of the ending role tree 77. According to the ending role tree 77 generated as a result of the transformation process for realizing a computation structure of a computer program, a row of positions indicated by the role names "EXTERNAL PROCEDURE DECLARATION" and "VARIABLE DECLARATION" on the role tree is checked, and if necessary declarations do not exist, they are supplied. In this example, the declaration of a procedure name: frequency analysis and declarations relative to array type data x, f are supplied. This transformation process is executed according to a set 76ea of transformation rules for realizing a computation structure of a computer program.

FIGS. 18A and 18B show the content of the set 76ea of transformation rules for realizing a computation structure of a computer program, which is applied to the third-3 processor. The set 76ea of transformation rules for realizing a computation structure of a computer program is applied as a set of role tree transformation rules to the third-3 processor 76e. When the third-3 processor 76e executes the transformation process for realizing a computation structure of a computer program, the behavior structure description role tree 76d is transformed into the ending role tree 77 according to the set 76ea of transformation rules for realizing a computation structure of a computer program. It should be noted that array type data used as an argument are replaced with a row of names in the ending role tree 77 by using the set 76ea of transformation rules for realizing a computation structure of a computer program. The reason for this is that a writing method for writing array names for arguments and arrays that appear is assumed as specifications of a target programming language.

The fourth processor 78 applies a set of patterns and a vocabulary set to a computer program intermediate output of the ending role tree 77 to effect a linguistic description generating process for thereby generating a computer program source code 79.

FIG. 19 shows the content of the computer program source code 79. The computer program source code 79 corresponds to the original program 31 shown in FIG. 2. In the linguistic description generating process carried out by the fourth processor 78, a code for determining the outer frame of a program source code is given as data of strings of role pattern characters, and the name "fft" of a frequency analysis program is given as data of strings of vocabulary characters for thereby generating the computer program source code 79. An example of expression generation data that are used by the fourth processor 78 at this time is indicated below.

Figure 21:
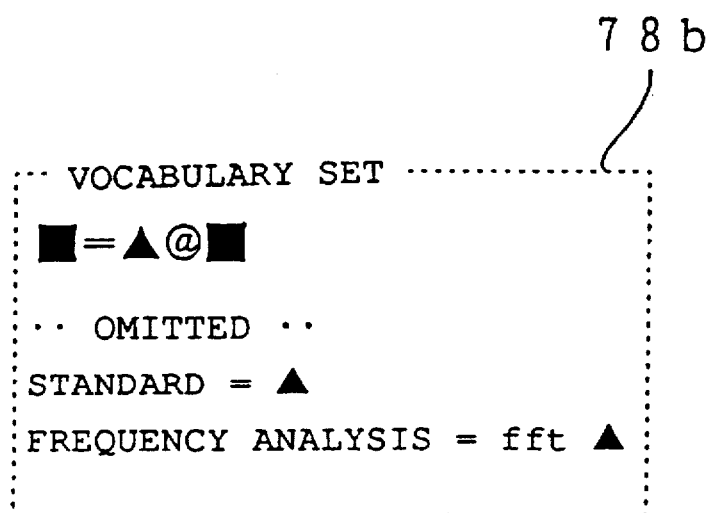
FIG. 21 is a diagram showing the content of a vocabulary set as applied to the fourth processor.
Figure 28:
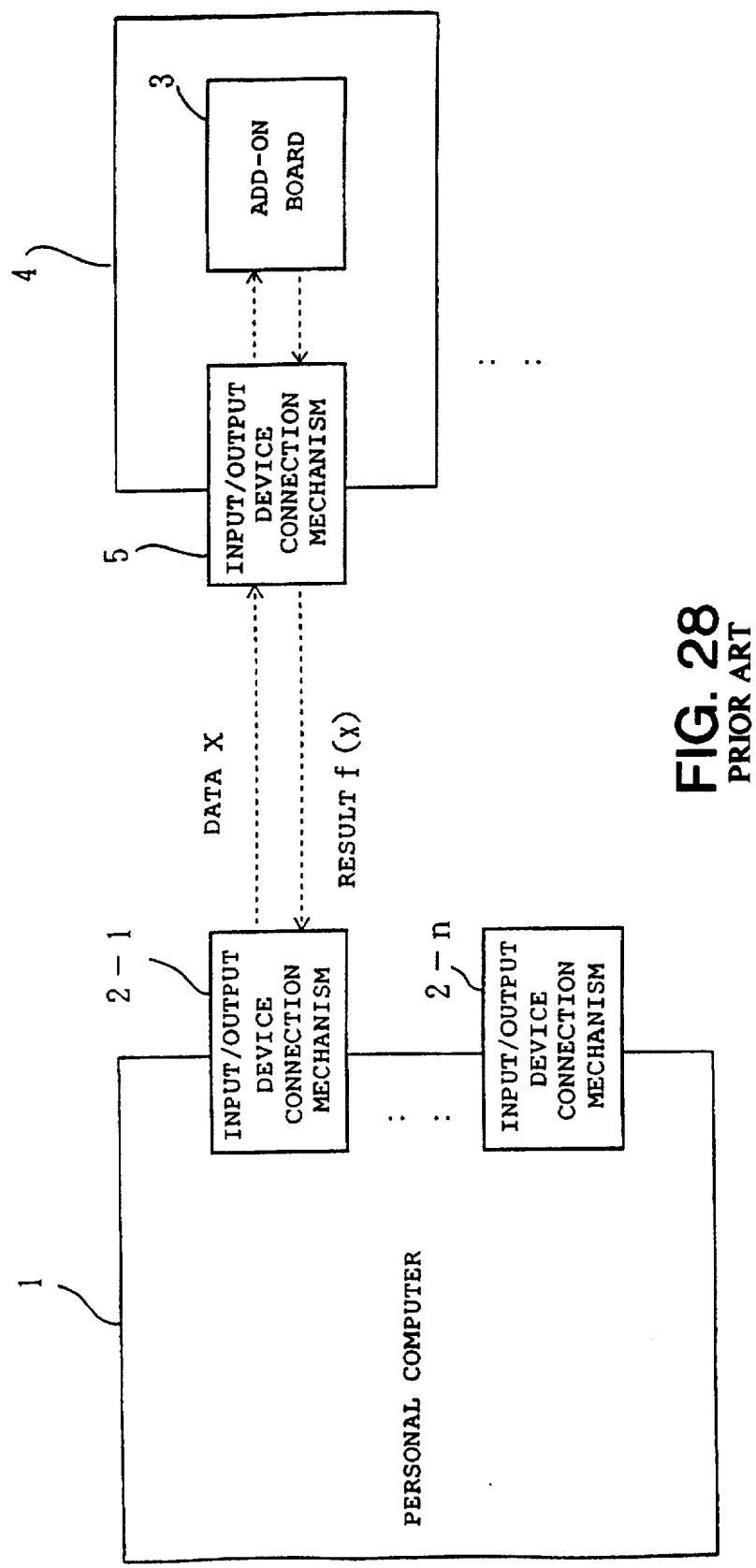
FIG. 28 is a block diagram showing the manner in which an add-on board is connected to a personal computer.

FIG. 20 shows the content of a set of patterns applied to the fourth processor 78, and FIG. 21 shows the content of a vocabulary set applied to the fourth processor 78. The fourth processor 78 effects an expression generating process on the ending role tree 77 according to a set of patterns and a vocabulary set to which there have been added a pattern set 78a composed of data of strings of role pattern characters and a vocabulary set 78b composed of data of strings of vocabulary characters, thereby generating the computer program source code 79.

In order to produce a program for carrying out a frequency analysis using an add-on board, the role tree transformation rule data in the third-2 processor 76c and the expression generation data in the fourth processor 78, among the data in the first processor 72, the second processor 74, the third-1 processor 76a, the third-2 processor 76c, the third-3 processor 76e, and the fourth processor 78, are modified. Those data which are modified due to the addition of the add-on board are replaced with new data, and the data that have been used to generate the original program are reused as those data in the first processor 72, the second processor 74, the third-1 processor 76a, the third-2 processor 76c, the third-3 processor 76e, and the fourth processor 78 which are not replaced.

The set 76ca of transformation rules for realizing a computation structure, which represent transformation data for specifying an implementation method for computation, of the role tree transformation rules used to generate the original program is illustrated in FIGS. 16A and 16B. Those data of the set 76ca of transformation rules which are affected by the addition of the add-on board are a data portion in which a frequency analysis pattern is detailed by a procedure calling pattern having a procedure name "FRE- QUENCY ANALYSIS". Data for rewriting this data portion are generated by the transformation data updating means 20.

FIGS. 22A, 22B, and 22C show updated transformation data 24 for rewriting the original program. According to the updated transformation data 24 generated by the transformation data updating means 20, data relative to a frequency analysis are detailed by a procedure calling for a procedure having a procedure name "OPERATE ADD-ON BOARD". Associated processes for using the procedure with the procedure name "OPERATE ADD-ON BOARD", i.e., indication of a command "fft" to be executed by the add-on board, insertion of "START USING ADD-ON BOARD" which is a program to declare the start of use of the add-on board, insertion of "END USING ADD-ON BOARD" which is a program to declare the end of use of the add-on board, and writing of an identification number "1" of an input/output device connection mechanism for installing the add-on board in the form of "ADD-ON BOARD CONNECTION PATH" as an argument of "START USING ADD-ON BOARD" and "END USING ADD-ON BOARD", are put together as transformation rule data. If these rules are corrected on the source code, it is necessary to correct texts that are scattered in distance locations. However, related transformation rules may be put together in one location.

Various names that are newly introduced by updating transformation rule data are added to the expression generation data in the fourth processor 78.

FIG. 23 shows a pattern addition of updating expression generation data for rewriting the original program, and FIG. 24 shows a vocabulary addition of updating expression generation data for rewriting the original program. The updated expression generation data 25 generated by the transformation data updating means 20 include role pattern character string data 25a added to the pattern set 78a shown in FIG. 20, and vocabulary character string data 25b added to the vocabulary set 78b shown in FIG. 21. The role pattern character string data 25a are concerned with the syntax of the programming language, and the vocabulary character string data 25b include the program names of a program "EXECUTE ADD-ON BOARD OPERATION", a program "START USING ADD-ON BOARD", and a program "END USING ADD-ON BOARD", values of "ADD-ON BOARD CONNECTION DEVICE NO." which are arguments of the program "START USING ADD-ON BOARD" and the program "END USING ADD-ON BOARD", etc. If data relative to the syntax of the programming language are available in advance as reusable data, then it is sufficient to have vocabulary character string data available as expression generation data that are to be essentially added.

By correcting the role tree transformation rule data for generating the original program and the expression generating data in the manner given above and effecting a transformation from the initial document, a program rewritten for using the add-on board is obtained. Such a process will be described below.

FIGS. 25A, 25B, and 25C show the content of a behavior structure description role tree reflecting the updated transformation data. The role tree until it is inputted to the third-2 processor 76c is the same as when the original program is generated. By correcting the transformation data in the third-2 processor 76c into the updated transformation data 24, a behavior structure description role tree 76da which reflects the updated transformation data is generated according to the transformation process for specifying an implementation method for computation by the third-2 processor 76c. According to the behavior structure description role tree 76da, the process of detailing the frequency analysis pattern is updated.

FIGS. 26A, 26B, and 26C show the content of a corrected ending role tree. An ending role tree 77a capable of generating a rewritten program is produced as a result of applying the third-3 processor 76e to the behavior structure description role tree 76da. According to the ending role tree 77a, the role pattern "FREQUENCY ANALYSIS" of a procedure calling statement which appears twice is rewritten into a role pattern for using the program "OPERATE ADD-ON BOARD" according to the same transformation rule.

FIG. 27 shows a corrected computer program source code 79d. The corrected computer program source code 79d corresponds to the rewritten program 41 shown in FIG. 2. In the linguistic description generating process carried out by the fourth processor 78, the ending role tree 77a is generated based on the expression generating data to which the updated expression generation data 25 have been added, thereby generating the corrected computer program source code 79d. In the corrected computer program source code 79d, a section "a" corresponds a portion where a subprogram name is replaced with a newly introduced one, in a chain of rewritten program sections due to an add-on board change, a section "b" corresponds to declarations to start and end using an add-on board and the writing of an input/output device connection mechanism specifying number, and a section "c" corresponds to the writing of the name of an operation "fft" executed by the add-on board and the writing of a code for checking operation of the add-on board.

According to the present invention, as described above, there is added, to a program generating means using an individuals language for generating a specific program by transforming an abstract program written by the individual's language through intermediate data called role trees into the specific program, a transformation data updating means for adding and updating transformation specifying data for controlling a role tree transformation procedure.

Therefore, when the program is rewritten as required by the addition of an add-on board, the rewriting procedure which has been complex if effected manually is automatized, and is free of correction failures or errors which would otherwise occur in the manual rewriting procedure and hence is highly reliable. The automatization of the rewriting procedure is effective to reduce the period of time needed to rewrite the program.

Heretofore, when a program is corrected at a source code level, programs generated as a result of rewriting procedures are accumulated, and even if the program is aimed at the same purpose, a plurality of programs are produced which are rewritten for the reason of the addition of add-on boards. According to the present invention, however, a program is accumulated in each information processing procedure as information classified and organized as one initial document and a set of transformation data classified for each add-on board. Therefore, it is not necessary to compare a plurality of programs for the purpose of understanding the contents of the programs at the time of program maintenance.

When the user of a personal computer wants to add an add-on board suitable for solving a certain problem to his own computer system, the user is required to rewrite an application program for the computer system. According to the present invention, since the user can easily effect such a program rewriting procedure, use of such add-on boards is promoted.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A program generating system for rewriting an original program to accelerate execution of the original program by taking advantage of a dedicated application-specific add-on board designed to execute certain segments of a program in an efficient manner.

the program generating system comprising:

an original program comprising a computer-executable program generated by applying transformation data to an initial document, describing functions in a natural language, which solve a specific problem:

the transformation data including a set of role patterns, in a role tree format, indicative of the roles of each sub-unit of the original program and role assignment knowledge providing relationships between the patterns.

means for updating the transformation data to generate updated transformation data, having the role tree format, for rewriting the original program to take advantage of the application-specific add-on board, by partly changing the set of role patterns and role assignment knowledge related to the use of the application-specific add-on board; and means for generating a rewritten program, which takes advantage of the application-specific add-on board, from the initial document using the updated transformation data.

2. A program generating system according to claim 1, wherein said means for updating the transformation data comprises:

transformation data holding means for holding all transformation data up to a given time;

updating transformation data input means for inputting transformation data used in rewriting the original program to take advantage of the application-specific add-on board; and updated transformation data generating means for updating the transformation data held by said transformation data holding means with the transformation data inputted by said updating transformation data input means generating updated transformation data necessary to generate the rewritten program.

3. A program generating system according to claim 2, wherein said means for updating the transformation data further comprises:

means for applying the updated transformation data generated by said updated transformation data generating means to rewrite said original program, to a set of role tree transformation rules for the original program in a transformation process for specifying an implementation method for computation in said means for generating a program using the individual's language, for thereby modifying the role tree transformation rules.

4. A program generating system according to claim 2, wherein said means for updating the transformation data further comprises:

means for applying updated expression generating data for rewriting the original program which are generated by said updated transformation data generating means, to a set of patterns and a vocabulary set for the original program in a linguistic description generating process in said means for generating a program using the individual's language, for thereby adding a pattern and vocabulary.

5. A method of transforming an original program to take advantage of a dedicated application-specific add-on board which executes certain segments of a program in an efficient manner, the method comprising:

retrieving an initial document which describes functions of the original program, in a natural language, which solves a specific problem;

retrieving an original set of transformation data which specifies how to create the original program from the initial document the transformation data including a set of role patterns, in a role tree format, indicative of the roles of each sub-unit of the original program and role assignment knowledge providing relationships between the role patterns;

correcting the original set of transformation data to produce a set of updated transformation data required to produce a rewritten program from the initial document which takes advantage of the application specific add-on board by partly changing the set of role patterns and role assignment knowledge related to the use of the application-specific add-on board; and generating the rewritten program from the initial document using the set of updated transformation data.

6. A method as in claim 5, further comprising:

generating the original program from the initial document based on the original set of transformation data.

7. A method as in claim 5, further comprising:

generating the initial document based on the original program.

8. A method as in claim 5, wherein the step of generating the rewritten program accesses a knowledge base.

* * * * *